United States Patent
Masuda et al.

(10) Patent No.: US 10,837,391 B2
(45) Date of Patent: *Nov. 17, 2020

(54) CONTROL SYSTEM FOR COMPRESSION IGNITION ENGINE

(71) Applicant: Mazda Motor Corporation, Hiroshima (JP)

(72) Inventors: Yuta Masuda, Hiroshima (JP); Masayoshi Higashio, Hiroshima (JP); Yugou Sunagare, Hiroshima (JP); Michio Ito, Hatsukaichi (JP); Kenko Ujihara, Higashihiroshima (JP); Yuto Matsushima, Hatsukaichi (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/457,137

(22) Filed: Jun. 28, 2019

(65) Prior Publication Data
US 2020/0032736 A1 Jan. 30, 2020

(30) Foreign Application Priority Data
Jul. 26, 2018 (JP) .................. 2018-140671

(51) Int. Cl.
  F02D 41/30 (2006.01)
  F02D 41/14 (2006.01)
  F02D 41/00 (2006.01)

(52) U.S. Cl.
  CPC ..... F02D 41/3035 (2013.01); F02D 41/1454 (2013.01); F02D 41/1473 (2013.01); F02D 41/0085 (2013.01)

(58) Field of Classification Search
  CPC ............. F02D 41/3035; F02D 41/1454; F02D 41/1473; F02D 41/0085; F02D 41/307;
(Continued)

(56) References Cited

U.S. PATENT DOCUMENTS 6,196,183 B1    3/2001  Bauer et al.
9,488,094 B2 *  11/2016 Yamashita .............. F02B 11/00
(Continued)

FOREIGN PATENT DOCUMENTS

EP    2998548 A1    3/2016
EP    3006704 A1    4/2016
(Continued)

OTHER PUBLICATIONS

European Patent Office, Extended European Search Report Issued in Application No. 19186893.4, dated Jan. 2, 2020, Germany, 10 pages.

*Primary Examiner* — Hai H Huynh
(74) *Attorney, Agent, or Firm* — Alleman Hall Creasman & Tuttle LLP

(57) ABSTRACT

A control system for a compression ignition engine is provided, which includes a combustion chamber, a throttle valve, an injector, an ignition plug, a sensor, and a controller. A changing module of the controller outputs a signal to the throttle valve so that an air amount increases more than before a demand of changing from a first mode to a second mode, and outputs to the injector a signal to increase a fuel amount according to the air amount increase so that an air-fuel ratio of mixture gas becomes at or substantially at a stoichiometric air-fuel ratio, and outputs to the ignition plug a signal to retard an ignition timing so that an engine torque increase caused by the fuel amount increase is reduced. The changing module reduces the retarding of the ignition timing when the ignition timing is determined to have reached a retard limit.

20 Claims, 20 Drawing Sheets

(58) Field of Classification Search
CPC .. F02D 41/0002; F02D 41/3041; F02D 37/02; F02P 5/1504
USPC ............. 123/299, 300, 305, 399, 436, 672; 701/103–105, 110
See application file for complete search history.

(56) References Cited

U.S. PATENT DOCUMENTS

| | | |
|---|---|---|
| 10,358,971 B2 * | 7/2019 | Ochi .................. F02D 41/0057 |
| 2006/0196469 A1 | 9/2006 | Kuo et al. |
| 2010/0222985 A1 | 9/2010 | Yun et al. |
| 2010/0241341 A1 | 9/2010 | Yun et al. |
| 2020/0032734 A1 * | 1/2020 | Masuda .................. F02D 41/40 |

FOREIGN PATENT DOCUMENTS

| | | |
|---|---|---|
| WO | 2015107825 A1 | 7/2015 |
| WO | 2018096744 A1 | 5/2018 |

* cited by examiner

CONTROL SYSTEM FOR COMPRESSION IGNITION ENGINE

TECHNICAL FIELD

The technology disclosed herein relates to a control system for a compression ignition engine.

BACKGROUND OF THE DISCLOSURE

It is known that combustion by compressed self-ignition in which a mixture gas combusts at once without flame propagation being intervened maximizes fuel efficiency because of the shortest combustion period. However, various problems of the combustion by compressed self-ignition need to be solved to be applied to automobile engines. For example, since the operating state and the environmental condition vary largely in the automotive application, it is a large problem to carry out a stable compressed self-ignition. In the automobile engines, the combustion by compressed self-ignition has not yet put in practical use.

In order to solve this problem, for example, WO2018/096744A1 proposes SPCCI (SPark Controlled Compression Ignition) combustion in which SI (Spark Ignition) combustion and CI (Compression Ignition) combustion are combined. The SI combustion is combustion accompanied by the flame propagation started by forcibly igniting the mixture gas inside a combustion chamber. The CI combustion is combustion started by the mixture gas inside the combustion chamber carrying out compressed self-ignition. The SPCCI combustion is combustion in which the mixture gas inside the combustion chamber is forcibly ignited to start the combustion by flame propagation, and unburnt mixture gas inside the combustion chamber then combusts by compression ignition due to a pressure buildup caused by generation of heat and flame propagation of the SI combustion. Since the SPCCI combustion includes the CI combustion, it is one form of "combustion by compression ignition."

The CI combustion in SPCCI combustion takes place when the in-cylinder temperature reaches the ignition temperature which is defined by the composition of the mixture gas. Fuel efficiency can be maximized if the in-cylinder temperature reaches the ignition temperature near a compression top dead center and CI combustion takes place. The in-cylinder temperature increases according to an increase in the in-cylinder pressure. The in-cylinder pressure during SPCCI combustion is a result of two pressure buildups comprised of a pressure buildup by a compression work of the piston during a compression stroke and a pressure buildup caused by the generation of heat during SI combustion.

Since SPCCI combustion is one form of the combustion by compression ignition, it is possible to achieve the stable combustion even if the air-fuel ratio of the mixture gas is made leaner than the stoichiometric air-fuel ratio, as also disclosed in WO2018/096744A1. The engine which performs SPCCI combustion can operate with a high thermal efficiency, while reducing the generation of raw NOR, by making the air-fuel ratio of the mixture gas, for example, 25:1 or higher.

However, the pressure buildup by SI combustion during SPCCI combustion depends on the combustion speed, i.e., the flame propagation speed of SI combustion. If the flame propagation of SI combustion is not stable, it becomes difficult for the pressure buildup caused by the generation of heat during SI combustion to fully be secured, and to raise the in-cylinder temperature to the ignition temperature. As a result, the amount of the mixture gas which carries out CI combustion decreases, and most of the mixture gas carry out SI combustion, or CI combustion occurs in the second half of an expansion stroke. Therefore, thermal efficiency of the engine cannot be maximized.

For example, when the engine is under a specific operating condition, such as when the engine water temperature is low, or when the intake air temperature is low, it becomes difficult to stably carry out SI combustion of the lean mixture gas. The engine thermal efficiency is not maximized even if SPCCI combustion is performed. Therefore, when the engine water temperature is low or when the intake air temperature is low, it is thought that the engine performs SPCCI combustion, while setting the air-fuel ratio of the mixture gas at the stoichiometric air-fuel ratio or the substantially stoichiometric air-fuel ratio. When the air-fuel ratio of the mixture gas is set to the stoichiometric air-fuel ratio or the substantially stoichiometric air-fuel ratio, the flame propagation of SI combustion in SPCCI combustion becomes stable even when the engine water temperature is low and the intake air temperature is low. Therefore, CI combustion can be started near the compression top dead center, and the engine thermal efficiency can be improved. Moreover, when the air-fuel ratio of the mixture gas is set to the stoichiometric air-fuel ratio or the substantially stoichiometric air-fuel ratio, NOR contained in exhaust gas can be purified using a three-way catalyst attached to the exhaust passage.

In the meantime, when the engine load increases and the fuel amount increases, it becomes difficult to fill up the combustion chamber with air until the air-fuel ratio of the mixture gas reaches 25 or higher.

In order for the engine which performs SPCCI combustion to achieve both the improvement of the exhaust emission performance and the improvement of thermal efficiency, the present inventors came up with an idea of changing an engine mode according to an engine state between a mode in which SPCCI combustion of the mixture gas at the stoichiometric air-fuel ratio or the substantially stoichiometric air-fuel ratio is carried out (i.e., a first mode), and a mode in which SPCCI combustion of the mixture gas leaner than the stoichiometric air-fuel ratio is carried out (i.e., a second mode).

However, since the changing between the first mode and the second mode is accompanied by a change in the air-fuel ratio of the mixture gas, the amount of air to be delivered to the combustion chamber must also be changed. When changing the engine mode from the first mode to the second mode, although the amount of air to be delivered to the combustion chamber must be increased, the air-fuel ratio of the mixture gas becomes higher than the stoichiometric air-fuel ratio (e.g., 14.7:1) and lower than 25:1 at which the generation of raw $NO_x$ can be reduced, during a delay period before the air amount increases to a given amount. The air-fuel ratio of the mixture gas is higher than a stoichiometric air-fuel ratio and lower than 25:1, raw $NO_x$ is generated during the combustion of the mixture gas, and it becomes difficult to purify $NO_x$ contained in the exhaust gas since the air-fuel ratio is off a purification window of the three-way catalyst. Similar problems occur when changing the engine mode from the second mode to the first mode.

SUMMARY OF THE DISCLOSURE

The technology disclosed herein prevents a reduction of emission performance during a mode change in an engine which is capable of changing a mode between a first mode and a second mode of which an air-fuel ratio of mixture gas is different from the first mode.

The present inventors decided to increase a fuel amount during a period of the mode change where the air amount changes, so that the air-fuel ratio of the mixture gas becomes a stoichiometric air-fuel ratio or a substantially stoichiometric air-fuel ratio.

However, if the fuel amount is increased, the engine torque increases by the amount of fuel increased. Thus, the present inventors decided to increase the fuel amount, and retard the ignition timing so that the torque increase of the engine by the increase in the fuel amount is reduced. Since SI combustion and CI combustion in SPCCI combustion are retarded by retarding the ignition timing, the engine torque can be reduced.

However, if the ignition timing is excessively retarded, CI combustion in SPCCI combustion may not occur, or the stability of SI combustion may be reduced. Therefore, the present inventors decided to control the increase in the fuel amount and the retarding of the ignition timing, when the ignition timing reaches a retard limit defined by the stability of SPCCI combustion.

Specifically, the technology disclosed herein relates to a control system for a compression-ignition engine. This control system for the engine includes a combustion chamber of the engine defined by a cylinder, a piston configured to reciprocate inside the cylinder, and a cylinder head closing one end of the cylinder, a throttle valve configured to adjust an amount of air delivered to the combustion chamber, an injector attached to the cylinder head and configured to inject fuel to be supplied into the combustion chamber, an ignition plug disposed so as to be oriented in the combustion chamber and configured to ignite a mixture gas inside the combustion chamber, a sensor configured to measure a parameter related to operation of the engine, and a controller having circuitry connected with the throttle valve, the injector, the ignition plug, and the sensor, configured to perform a calculation in response to measurement signals from the sensor and output signals to the throttle valve, the injector, and the ignition plug. The controller is configured to execute a first mode module in which the engine is operated in a first mode, a second mode module in which the engine is operated in a second mode, and a changing module to change a mode from the first mode to the second mode in response to a change demand.

The first mode module outputs the signals to the injector and the throttle valve so that a fuel amount becomes an amount according to a load of the engine and an air-fuel ratio of the mixture gas becomes a first air-fuel ratio, and outputs an ignition signal to the ignition plug so that a portion of the mixture gas starts combustion accompanied by flame propagation by a forcible ignition of the ignition plug, and a remaining portion of unburnt mixture gas then combusts by self-ignition. The second mode module outputs the signals to the injector and the throttle valve so that the fuel amount becomes the amount according to the engine load and the air-fuel ratio of the mixture gas becomes a second air-fuel ratio higher than the first air-fuel ratio, and outputs the ignition signal to the ignition plug so that a portion of the mixture gas starts combustion accompanied by flame propagation by a forcible ignition of the ignition plug, and a remaining portion of unburnt mixture gas then combusts by self-ignition. The changing module outputs the signal to the throttle valve so that the air amount increases more than before the change demand, and outputs to the injector a signal to increase the fuel amount according to the increase in the air amount so that the air-fuel ratio of the mixture gas becomes a stoichiometric air-fuel ratio or a substantially stoichiometric air-fuel ratio, and outputs to the ignition plug a signal to retard an ignition timing so that a torque increase of the engine caused by the increase in the fuel amount is reduced. In addition, the changing module reduces the retarding of the ignition timing when the ignition timing is determined to have reached a retard limit.

According to this configuration, the first mode module operates the engine by performing SPCCI combustion of the mixture gas at the first air-fuel ratio. The second mode module operates the engine by performing SPCCI combustion of the mixture gas at the second air-fuel ratio which is higher than the first air-fuel ratio.

Here, the first air-fuel ratio may be, for example, the stoichiometric air fuel ratio or the substantially stoichiometric air-fuel ratio. Thus, exhaust gas can be purified by a three-way catalyst attached to an exhaust passage of the engine. The "stoichiometric air fuel ratio or substantially stoichiometric air-fuel ratio" can be said as the air-fuel ratio set within a purification window of the three-way catalyst. The second air-fuel ratio may be suitably set to 25:1 or higher. This can reduce the generation of raw $NO_x$ during the combustion of the mixture gas.

When changing the engine mode from the first mode to the second mode, the amount of air to be delivered to the combustion chamber must be increased since the second air-fuel ratio is higher than the first air-fuel ratio. The changing module outputs the signal to the throttle valve so that the air amount increases more than before the change demand. For example, the opening of the throttle valve may be changed from small to large.

As the amount of air increases, the air-fuel ratio of the mixture gas is deviated from the first air-fuel ratio. Since the air amount increase delays, the air-fuel ratio of the mixture gas is also deviated from the second air-fuel ratio. There is a possibility to degrade exhaust emission performance, thus, the changing module outputs to the injector the signal to increase the fuel amount according to the increasing air amount. Thus, the air-fuel ratio of the mixture gas becomes the stoichiometric air-fuel ratio or the substantially stoichiometric air-fuel ratio, and the exhaust gas can be purified with the three-way catalyst.

Further, the changing module retards the ignition timing so that the torque increase of the engine caused by the increase in the fuel amount is reduced. This can prevent that the torque of the engine increases as the fuel amount increases, and an occurrence of unnecessary torque shock can be avoided.

When the ignition timing reaches the retard limit during the increase of the air amount, the changing module reduces the retarding of the ignition timing. Thus, stability of SPCCI combustion is secured and degradation of fuel efficiency of the engine is avoided. The retard limit may be determined based on a preset map or based on a preset model.

When the ignition timing is determined to have reached the retard limit, the changing module continues the increasing of the fuel amount and increases a load of an alternator driven by the engine.

When the increasing of the fuel amount continues according to the increase of the air amount after the ignition timing reaches the retard limit, the air-fuel ratio can be maintained at the stoichiometric air-fuel ratio or the substantially stoichiometric air-fuel ratio, which is advantageous in improving the exhaust emission performance. Meanwhile, the torque of the engine increases as the fuel amount increases. The changing module increases the load of the alternator to reduce the increase amount of the torque of the engine even after the ignition timing reached the retard limit.

When the air amount is determined to have reached a given amount, the changing module ends the increasing of the fuel amount and the retarding of the ignition timing, and permits that the second mode module starts the second mode.

When the air amount which is increasing reaches the given amount, the air-fuel ratio of the mixture gas can be the second air-fuel ratio. The changing module ends the increasing of the fuel amount and the retarding of the ignition timing. The second module starts the second mode and the switch from the first mode to the second mode ends.

The changing module may change the mode from the first mode to the second mode, while the torque of the engine is maintained at a constant or substantially constant torque.

During switching from the first mode to the second mode, since the torque of the engine is constant or substantially constant, the fuel amount according to the engine load becomes the substantially constant amount.

According to the configuration described above, by the changing module increasing the fuel amount according to the increase in the air amount, the torque of the engine may increase. However, the changing module retards the ignition timing to reduce the torque, thus, the torque of the engine can be constant or substantially constant.

The retard limit may be on a retard side as an engine speed is lower and the load is higher, and on an advance side as the engine speed is higher and the load is lower.

When the engine speed is lower and the load is higher, the fuel amount is larger and the combustion stability is high, and even if the ignition timing is retarded, the time length from the ignition to the combustion can be longer. When the engine speed is lower and the load is higher, the retard limit is on the retard side. When the retard limit is on the retard side, even if the retarding amount of the ignition timing is increased, a misfire etc. can be reduced.

The control system may further include an exhaust gas recirculation (EGR) valve configured to adjust an amount of EGR gas introduced into the combustion chamber. The changing module may output the signal to the EGR valve so that the EGR amount decreases more than before the change demand.

When the EGR gas amount introduced into the combustion chamber is reduced, the stability of SPCCI combustion is higher, and even if the retarding amount of the ignition timing is increased, a misfire etc. can be reduced. The reducing of the EGR gas amount is advantageous in shifting the retard limit in the retarding direction.

In the control system, the controller may be further configured to adjust a strength of swirl inside the combustion chamber by adjusting an opening of a swirl valve. The changing module may output the signal to the swirl valve so that the opening of the swirl valve becomes smaller than before the change demand.

When the swirl inside the combustion chamber is strengthened, the stability of SPCCI combustion is higher, and even if the retarding amount of the ignition timing is increased, a misfire etc. can be reduced. The strengthening of the swirl is advantageous in shifting the retard limit in the retarding direction.

A control system for a compression ignition engine disclosed herein includes a combustion chamber of the engine defined by a cylinder, a piston configured to reciprocate inside the cylinder, and a cylinder head closing one end of the cylinder, a throttle valve configured to adjust an amount of air delivered to the combustion chamber, an injector attached to the cylinder head and configured to inject fuel to be supplied into the combustion chamber, an ignition plug disposed so as to be oriented in the combustion chamber and configured to ignite a mixture gas inside the combustion chamber, a sensor configured to measure a parameter related to operation of the engine, and a controller having circuitry connected with the throttle valve, the injector, the ignition plug, and the sensor, configured to perform a calculation in response to the measurement signal from the sensor and output signals to the throttle valve, the injector, and the ignition plug. The controller is configured to execute a first mode module in which the engine is operated in a first mode, a second mode module in which the engine is operated in a second mode, and a changing module to change a mode from the second mode to the first mode in response to a change demand.

The first mode module outputs the signals to the injector and the throttle valve so that a fuel amount becomes an amount according to a load of the engine and an air-fuel ratio of the mixture gas becomes a first air-fuel ratio, and outputs an ignition signal to the ignition plug so that a portion of the mixture gas starts combustion accompanied by flame propagation by a forcible ignition of the ignition plug, and a remaining portion of unburnt mixture gas then combusts by self-ignition. The second mode module outputs the signals to the injector and the throttle valve so that the fuel amount becomes the amount according to the load of the engine and the air-fuel ratio of the mixture gas becomes a second air-fuel ratio higher than the first air-fuel ratio, and outputs the ignition signal to the ignition plug so that a portion of the mixture gas starts combustion accompanied by flame propagation by a forcible ignition of the ignition plug, and a remaining portion of unburnt mixture gas combusts by self-ignition. The changing module outputs the signal to the throttle valve so that the air amount decreases more than before the change demand, and maintains the fuel amount until the air-fuel ratio of the mixture gas reaches a particular air-fuel ratio smaller than the second air-fuel ratio after the reducing of the air amount is started. When the air-fuel ratio of the mixture gas is determined to have reached the particular air-fuel ratio, the changing module continues the reducing of the air amount, outputs to the injector a signal to increase the fuel amount so that the air-fuel ratio of the mixture gas becomes a stoichiometric air-fuel ratio or a substantially stoichiometric air-fuel ratio, and outputs to the ignition plug a signal to retard an ignition timing so that a torque increase of the engine by the increase in the fuel amount is reduced. Further, when the air amount is determined to have reached a given amount, the changing module ends the increasing of the fuel amount and the retarding of the ignition timing, and permits that the first mode module starts the first mode.

According to this configuration, when changing the engine mode from the second mode to the first mode, the amount of air to be delivered to the combustion chamber must be reduced since the first air-fuel ratio is lower than the second air-fuel ratio. The changing module outputs the signal to the throttle valve so that the air amount reduces more than before the change demand. For example, the opening of the throttle valve may be changed from large to small.

As the amount of air decreases, the air-fuel ratio of the mixture gas is deviated from the second air-fuel ratio. The changing module maintains the fuel amount until the air-fuel ratio of the mixture gas reaches the particular air-fuel ratio smaller than the second air-fuel ratio. The particular air-fuel ratio may be an air-fuel ratio at rich limit at which raw NOR is not generated during the combustion of the mixture gas. This can reduce the generation of raw NOR. The fuel amount does not increase, and it is advantageous in improving fuel efficiency of the engine.

When the air-fuel ratio of the mixture gas reaches the particular air-fuel ratio, while the changing module continues the reducing of the air amount, it increases the fuel amount so that the air-fuel ratio of the mixture gas becomes the stoichiometric air-fuel ratio or the substantially stoichiometric air-fuel ratio. This can avoid degradation of the exhaust emission performance. Moreover, the changing module outputs to the ignition plug the signal to retard the ignition timing so that the torque increase of the engine by the increase in the fuel amount is reduced. This can prevent that the torque of the engine increases as the fuel amount increases, and the occurrence of unnecessary torque shock can be avoided.

When the air amount which is reducing reaches the given amount, the air-fuel ratio of the mixture gas can be the first air-fuel ratio. The changing module ends the increasing of the fuel amount and the retarding of the ignition timing. The first module starts the first mode and the switch from the second mode to the first mode ends.

The controller may be configured to execute a target torque setting module to set a target torque of the engine in response to the measurement signal from the sensor. The first mode module may output the signals to the injector and the throttle valve so that a fuel amount becomes an amount according to the target torque and the air-fuel ratio of the mixture gas becomes the first air-fuel ratio. The second mode module may output the signals to the injector and the throttle valve so that the fuel amount becomes the amount according to the target torque and the air-fuel ratio of the mixture gas becomes the second air-fuel ratio.

A control system for a compression ignition engine disclosed herein includes a combustion chamber of the engine defined by a cylinder, a piston configured to reciprocate inside the cylinder, and a cylinder head closing one end of the cylinder, a throttle valve configured to adjust an amount of air delivered to the combustion chamber, an injector attached to the cylinder head and configured to inject fuel to be supplied into the combustion chamber, an ignition plug disposed so as to be oriented in the combustion chamber and configured to ignite a mixture gas inside the combustion chamber, a sensor configured to measure a parameter related to operation of the engine, and a controller having circuitry connected with the throttle valve, the injector, the ignition plug, and the sensor, and configured to perform a calculation in response to the measurement signal from the sensor and output signals to the throttle valve, the injector, and the ignition plug. The controller is configured to execute a first mode module in which the engine is operated in a first mode based on the measurement signal from the sensor, a second mode module in which the engine is operated in a second mode based on the measurement signal from the sensor, a determining module to output the change demand from the first mode to the second mode when the determining module determines that a change condition is satisfied based on the measurement signal from the sensor, and a changing module to change the mode in response to the change demand.

The first mode module outputs the signals to the injector and the throttle valve so that a fuel amount becomes an amount according to a load of the engine and an air-fuel ratio of the mixture gas becomes a first air-fuel ratio, and outputs an ignition signal to the ignition plug so that a portion of the mixture gas starts combustion accompanied by flame propagation by a forcible ignition of the ignition plug, and a remaining portion of unburnt mixture gas then combusts by self-ignition. The second mode module outputs the signals to the injector and the throttle valve so that the fuel amount becomes the amount according to the load of the engine and the air-fuel ratio of the mixture gas becomes a second air-fuel ratio higher than the first air-fuel ratio, and outputs the ignition signal to the ignition plug so that a portion of the mixture gas starts combustion accompanied by flame propagation by a forcible ignition of the ignition plug, and a remaining portion of unburnt mixture gas then combusts by self-ignition. The changing module outputs the signal to the throttle valve so that the air amount increases more than before the change demand, and outputs to the injector a signal to increase the fuel amount according to the increase in the air amount so that the air-fuel ratio of the mixture gas becomes a stoichiometric air-fuel ratio or a substantially stoichiometric air-fuel ratio, and outputs to the ignition plug a signal to retard an ignition timing so that a torque increase of the engine caused by the increase in the fuel amount is reduced. The changing module reduces retarding of the ignition timing when the ignition timing is determined to have reached a retard limit.

A control system for a compression ignition engine disclosed herein includes a combustion chamber of the engine defined by a cylinder, a piston configured to reciprocate inside the cylinder, and a cylinder head closing one end of the cylinder, a throttle valve configured to adjust an amount of air delivered to the combustion chamber, an injector attached to the cylinder head and configured to inject fuel to be supplied into the combustion chamber, an ignition plug disposed so as to be oriented in the combustion chamber and configured to ignite mixture gas inside the combustion chamber, a sensor configured to measure a parameter related to operation of the engine, and a controller having circuitry connected with the throttle valve, the injector, the ignition plug, and the sensor, and configured to perform a calculation in response to the measurement signal from the sensor and output signals to the throttle valve, the injector, and the ignition plug. The controller is configured to execute a first mode module in which the engine is operated in a first mode based on the measurement signal from the sensor, a second mode module in which the engine is operated in a second mode based on the measurement signal from the sensor, a determining module to output the change demand from the first mode to the second mode when the determining module determines that a change condition is satisfied based on the measurement signal from the sensor, and a changing module to change the mode in response to the change demand.

The first mode module outputs the signals to the injector and the throttle valve so that a fuel amount becomes an amount according to a load of the engine and an air-fuel ratio of the mixture gas becomes a first air-fuel ratio, and outputs an ignition signal to the ignition plug so that a portion of the mixture gas starts combustion accompanied by flame propagation by a forcible ignition of the ignition plug, and a remaining portion of unburnt mixture gas then combusts by self-ignition. The second mode module outputs the signals to the injector and the throttle valve so that the fuel amount becomes the amount according to the load of the engine and the air-fuel ratio of the mixture gas becomes a second air-fuel ratio higher than the first air-fuel ratio, and outputs the ignition signal to the ignition plug so that a portion of the mixture gas starts combustion accompanied by flame propagation by the forcible ignition of the ignition plug, and a remaining portion of unburnt mixture gas then combusts by self-ignition. The changing module outputs the signal to the throttle valve so that the air amount decreases more than before the change demand, and maintains the fuel amount until the air-fuel ratio of the mixture gas reaches a particular air-fuel ratio smaller than the second air-fuel ratio after the reducing of the air amount is started. When the air-fuel ratio of the mixture gas is determined to have reached the particular air-fuel ratio, the changing module continues the reducing of the air amount, outputs to the injector a signal to increase the fuel amount so that the air-fuel ratio of the mixture gas becomes a stoichiometric air-fuel ratio or a substantially stoichiometric air-fuel ratio, and outputs to the ignition plug a signal to retard an ignition timing so that a torque increase of the engine by the increase in the fuel amount is reduced. Further, when the air amount is determined to have reached a given amount, the changing module ends the increasing of the fuel amount and the retarding of the ignition timing, and permits that the first mode module starts the first mode.

The controller may be configured to execute a target torque setting module to set a target torque of the engine in response to the measurement signal from the sensor. The first mode module may output, in response to the target torque, the signals to the injector and the throttle valve so that a fuel amount becomes an amount according to the target torque and the air-fuel ratio of the mixture gas becomes the first air-fuel ratio. The second mode module may output, in response to the target torque, the signals to the injector and the throttle valve so that the fuel amount becomes the amount according to the target torque and the air-fuel ratio of the mixture gas becomes the second air-fuel ratio.

DETAILED DESCRIPTION OF THE DISCLOSURE

Hereinafter, one embodiment of a control system for a compression ignition engine will be described in detail with reference to the accompanying drawings. The following description is one example of an engine and a control system of the engine.

Figure 1:
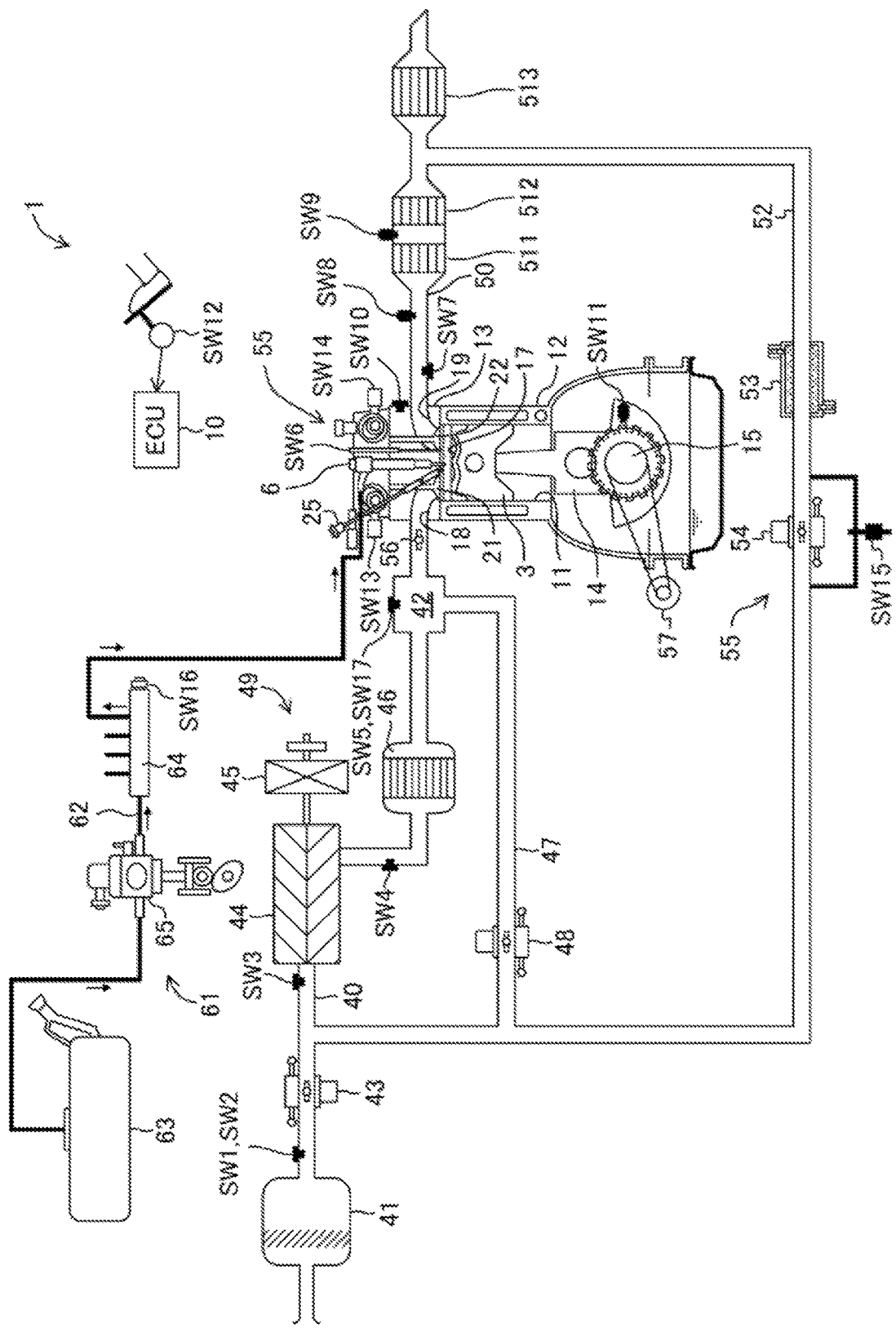
FIG. 1 is a view illustrating a configuration of an engine.
Figure 2:
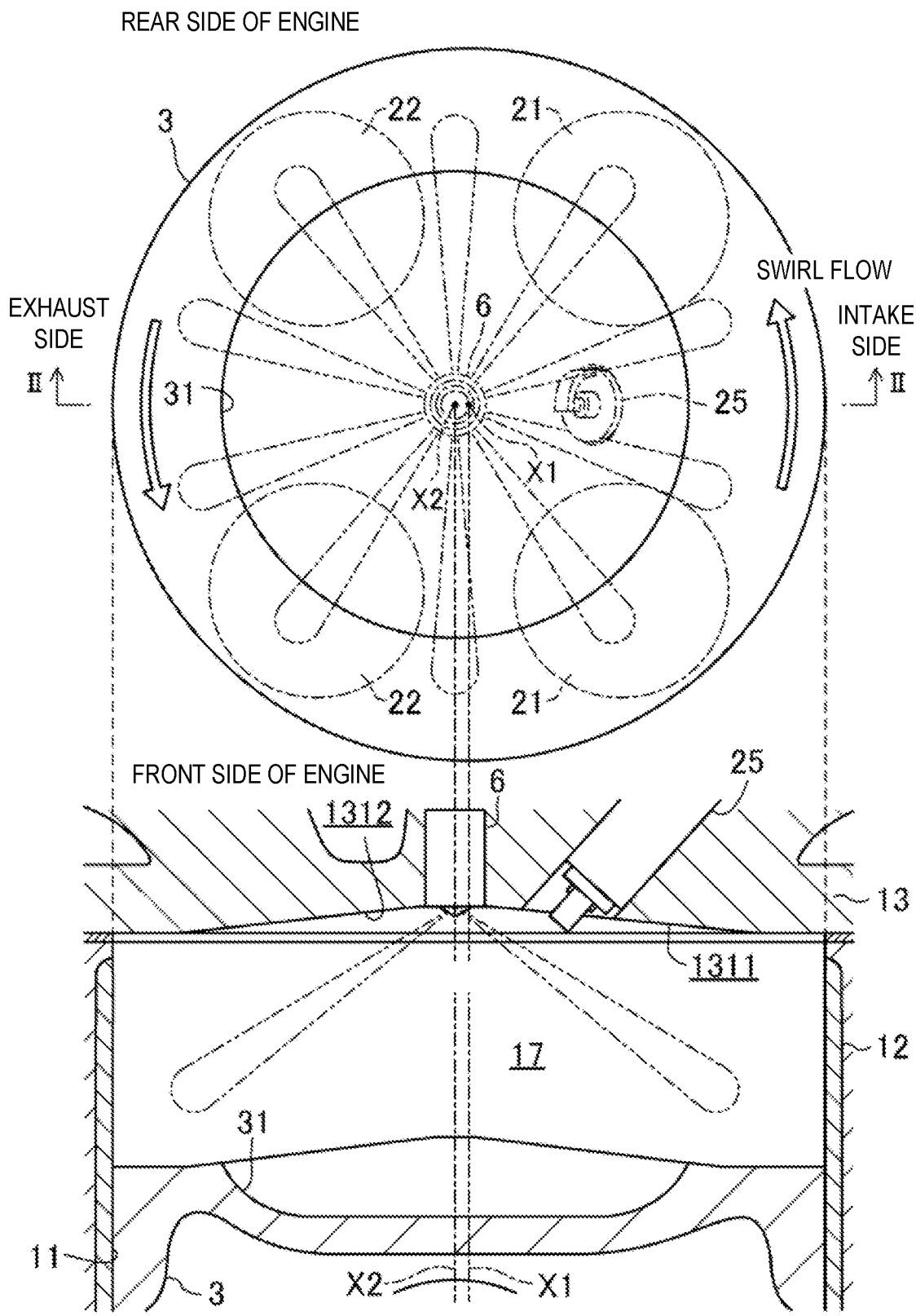
FIG. 2 is a view illustrating a configuration of a combustion chamber, where an upper figure corresponds to a plan view of the combustion chamber, and a lower figure is a cross-sectional view taken along a line II-II.
Figure 3:
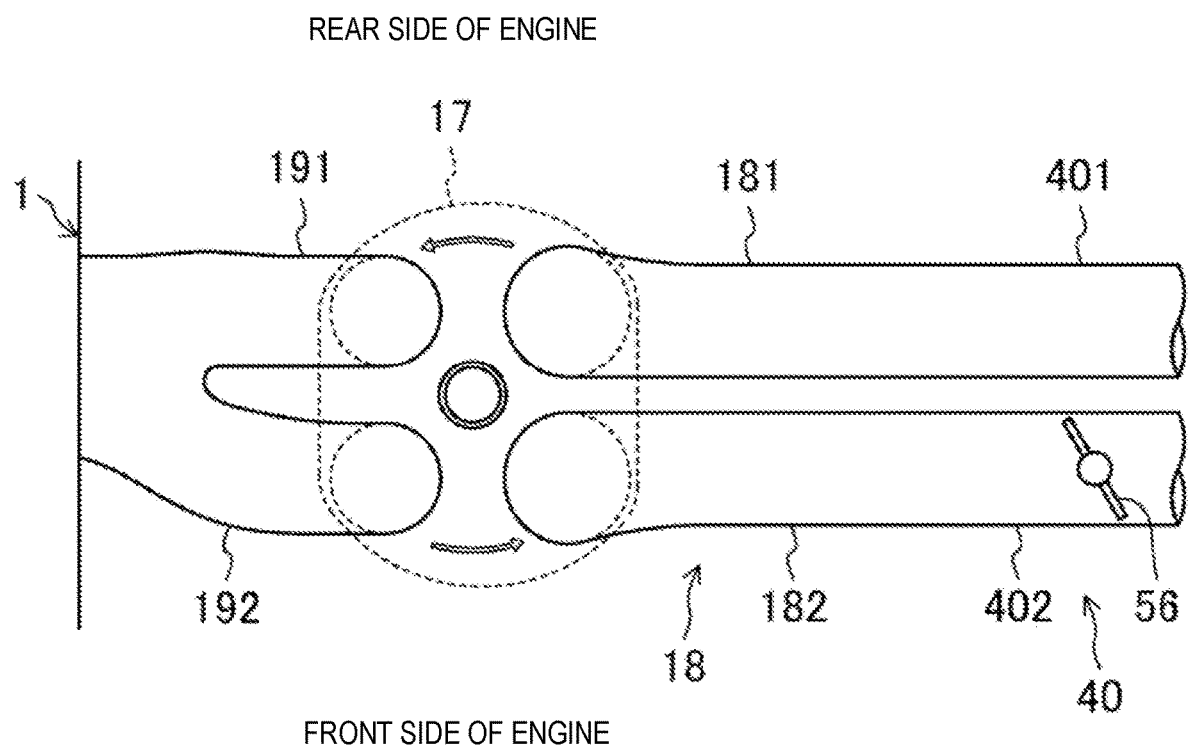
FIG. 3 is a plan view illustrating a configuration of the combustion chamber and an intake system.
Figure 4:
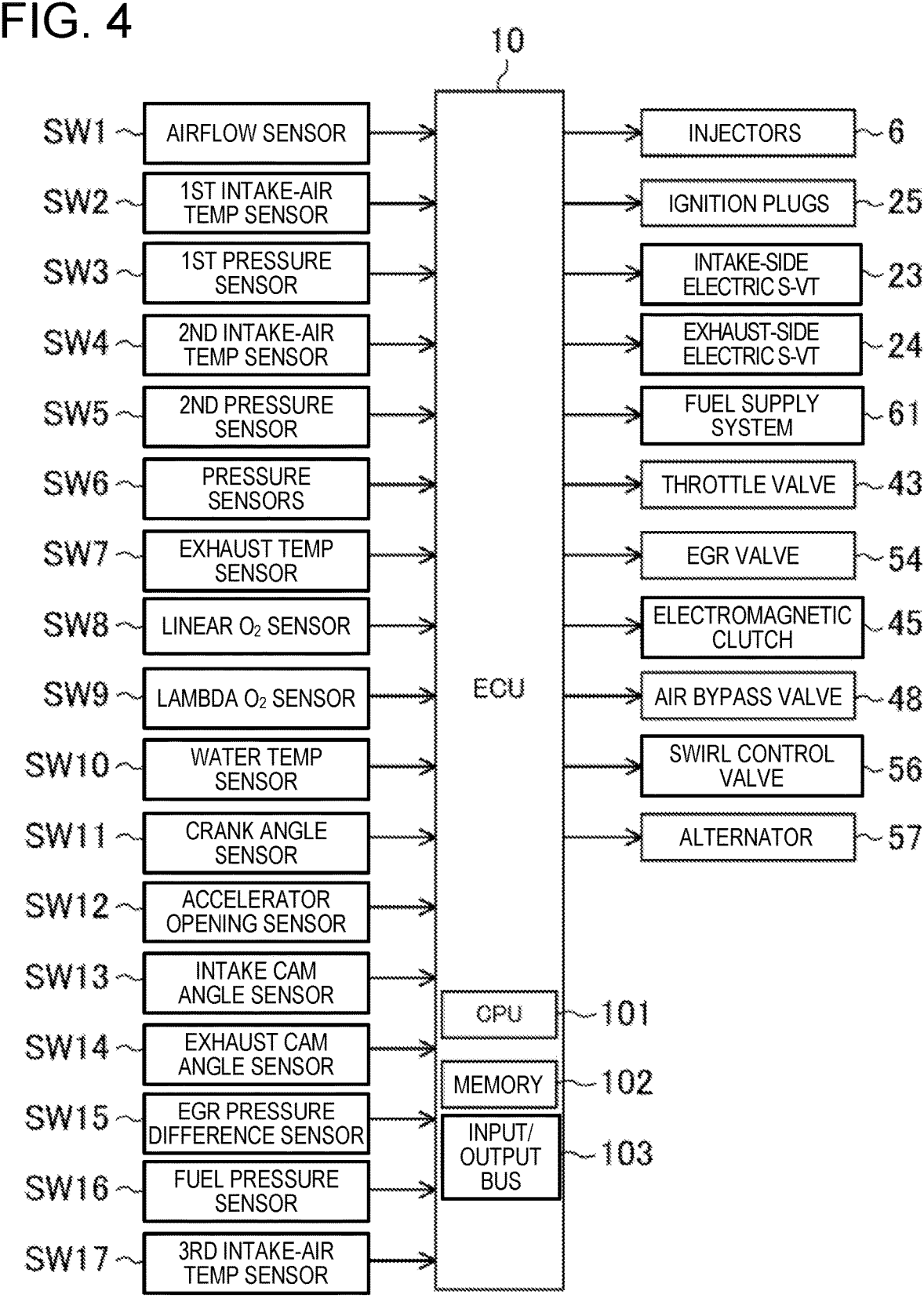
FIG. 4 is a block diagram illustrating a configuration of an engine control system.

FIG. 1 is a view illustrating a configuration of the compression-ignition engine. FIG. 2 is a view illustrating a configuration of a combustion chamber of the engine. FIG. 3 is a view illustrating a configuration of the combustion chamber and an intake system. Note that in FIG. 1, an intake side is the left side in the drawing, and an exhaust side is the right side in the drawing. In FIGS. 2 and 3, the intake side is the right side in the drawings, and the exhaust side is the left side in the drawings. FIG. 4 is a block diagram illustrating a configuration of a control system of the engine.

An engine 1 is a four-stroke engine which operates by combustion chambers 17 repeating an intake stroke, a compression stroke, an expansion stroke, and an exhaust stroke. The engine 1 is mounted on an automobile with four wheels. The automobile travels by operating the engine 1. Fuel of the engine 1 is gasoline in this example. The fuel may be a liquid fuel containing at least gasoline. The fuel may be gasoline containing, for example, bioethanol.
(Engine Configuration)

The engine 1 includes a cylinder block 12 and a cylinder head 13 placed thereon. A plurality of cylinders 11 are formed inside the cylinder block 12. In FIGS. 1 and 2, only one cylinder 11 is illustrated. The engine 1 is a multi-cylinder engine.

A piston 3 is slidably inserted in each cylinder 11. The pistons 3 are connected with a crankshaft 15 through respective connecting rods 14. Each piston 3 defines the combustion chamber 17, together with the cylinder 11 and the cylinder head 13. Note that the term "combustion chamber" may be used in a broad sense. That is, the term "combustion chamber" may refer to a space formed by the piston 3, the cylinder 11, and the cylinder head 13, regardless of the position of the piston 3.

As illustrated in the lower figure of FIG. 2, a lower surface of the cylinder head 13, i.e., a ceiling surface of the combustion chamber 17, is comprised of a slope 1311 and a slope 1312. The slope 1311 is a rising gradient from the intake side toward an injection axial center X2 of an injector 6 which will be described later. The slope 1312 is a rising gradient from the exhaust side toward the injection axial center X2. The ceiling surface of the combustion chamber 17 is a so-called "pent-roof" shape.

An upper surface of the piston 3 is bulged toward the ceiling surface of the combustion chamber 17. A cavity 31 is formed in the upper surface of the piston 3. The cavity 31 is a dent in the upper surface of the piston 3. The cavity 31 has a shallow pan shape in this example. The center of the cavity 31 is offset at the exhaust side with respect to a center axis X1 of the cylinder 11.

A geometric compression ratio of the engine 1 is set 10:1 or higher and 30:1 or lower. The engine 1 which will be described later performs SPCCI combustion that is a combination of SI combustion and CI combustion in a part of operating ranges. SPCCI combustion controls CI combustion using a heat generation and a pressure buildup by SI combustion. The engine 1 is the compression-ignition engine. However, in this engine 1, a temperature of the combustion chamber 17, when the piston 3 is at a compression top dead center (i.e., compression end temperature), does not need to be increased. In the engine 1, the geometric compression ratio can be set comparatively low. The low geometric compression ratio becomes advantageous in reduction of cooling loss and mechanical loss. For engines using regular gasoline (low octane fuel of which an octane number is about 91), the geometric compression ratio of the engine 1 is 14:1-17:1, and for those using high octane gasoline (high octane fuel of which the octane number is about 96), the geometric compression ratio is 15:1-18:1.

An intake port 18 is formed in the cylinder head 13 for each cylinder 11. As illustrated in FIG. 3, each intake port 18 has a first intake port 181 and a second intake port 182. The intake port 18 communicates with the corresponding combustion chamber 17. Although detailed illustration of the intake port 18 is omitted, it is a so-called "tumble port." That is, the intake port 18 has such a shape that a tumble flow is formed in the combustion chamber 17.

Each intake valve 21 is disposed in the intake ports 181 and 182. The intake valve 21 opens and closes a channel between the combustion chamber 17 and the intake port 181 or 182. The intake valves 21 are opened and closed at given timings by a valve operating mechanism. The valve operating mechanism may be a variable valve operating mechanism which varies the valve timing and/or valve lift. In this example, as illustrated in FIG. 4, the variable valve operating mechanism has an intake-side electric S-VT (Sequential-Valve Timing) 23. The intake-side electric S-VT 23 continuously varies a rotation phase of an intake cam shaft within a given angle range. The valve open timing and the valve close timing of the intake valve 21 vary continuously. Note that the electric S-VT may be replaced with a hydraulic S-VT, as the intake valve operating mechanism.

An exhaust port 19 is also formed in the cylinder head 13 for each cylinder 11. As illustrated in FIG. 3, each exhaust port 19 also has a first exhaust port 191 and a second exhaust port 192. The exhaust port 19 communicates with the corresponding combustion chamber 17.

Each exhaust valve 22 is disposed in the exhaust ports 191 and 192. The exhaust valve 22 opens and closes a channel between the combustion chamber 17 and the exhaust port 191 or 192. The exhaust valves 22 are opened and closed at a given timing by a valve operating mechanism. The valve operating mechanism may be a variable valve operating mechanism which varies the valve timing and/or valve lift. In this example, as illustrated in FIG. 4, the variable valve operating mechanism has an exhaust-side electric S-VT 24. The exhaust-side electric S-VT 24 continuously varies a rotation phase of an exhaust cam shaft within a given angle range. The valve open timing and the valve close timing of the exhaust valve 22 change continuously. Note that the electric S-VT may be replaced with a hydraulic S-VT, as the exhaust valve operating mechanism.

The intake-side electric S-VT 23 and the exhaust-side electric S-VT 24 adjust length of an overlap period where both the intake valve 21 and the exhaust valve 22 open. If the length of the overlap period is made longer, the residual gas in the combustion chamber 17 can be purged. Moreover, by adjusting the length of the overlap period, internal EGR (Exhaust Gas Recirculation) gas can be introduced into the combustion chamber 17. An internal EGR system is comprised of the intake-side electric S-VT 23 and the exhaust-side electric S-VT 24. Note that the internal EGR system may not be comprised of the S-VT.

The injector 6 is attached to the cylinder head 13 for each cylinder 11. Each injector 6 directly injects fuel into the combustion chamber 17. The injector 6 is one example of a fuel injection part. The injector 6 is disposed in a valley part of the pent roof where the slope 1311 and the slope 1312 meet. As illustrated in FIG. 2, the injection axial center X2 of the injector 6 is located at the exhaust side of the center axis X1 of the cylinder 11. The injection axial center X2 of the injector 6 is parallel to the center axis X1. The injection axial center X2 of the injector 6 and the center of the cavity 31 are in agreement with each other. The injector 6 faces the cavity 31. Note that the injection axial center X2 of the injector 6 may be in agreement with the center axis X1 of the cylinder 11. In such a configuration, the injection axial center X2 of the injector 6 and the center of the cavity 31 may be in agreement with each other.

Although detailed illustration is omitted, the injector 6 is comprised of a multi nozzle-port type fuel injection valve having a plurality of nozzle ports. As illustrated by two-dot chain lines in FIG. 2, the injector 6 injects fuel so that the fuel spreads radially from the center of the combustion chamber 17. The injector 6 has ten nozzle ports in this example, and the nozzle port is disposed so as to be equally spaced in the circumferential direction.

The injectors 6 are connected to a fuel supply system 61. The fuel supply system 61 includes a fuel tank 63 configured to store fuel, and a fuel supply passage 62 which connects the fuel tank 63 to the injector 6. In the fuel supply passage 62, a fuel pump 65 and a common rail 64 are provided. The fuel pump 65 pumps fuel to the common rail 64. The fuel pump 65 is a plunger pump driven by the crankshaft 15 in this example. The common rail 64 stores fuel pumped from the fuel pump 65 at a high fuel pressure. When the injector 6 is opened, the fuel stored in the common rail 64 is injected into the combustion chamber 17 from the nozzle ports of the injector 6. The fuel supply system 61 can supply fuel to the injectors 6 at a high pressure of 30 MPa or higher. The pressure of fuel supplied to the injector 6 may be changed according to the operating state of the engine 1. Note that the configuration of the fuel supply system 61 is not limited to the configuration described above.

An ignition plug 25 is attached to the cylinder head 13 for each cylinder 11. The ignition plug 25 forcibly ignites a mixture gas inside the combustion chamber 17. The ignition plug 25 is disposed at the intake side of the center axis X1 of the cylinder 11 in this example. The ignition plug 25 is located between the two intake ports 181 and 182 of each cylinder. The ignition plug 25 is attached to the cylinder head 13 so as to incline downwardly toward the center of the combustion chamber 17. As illustrated in FIG. 2, the electrode of the ignition plug 25 faces to the inside of the combustion chamber 17 and are located near the ceiling surface of the combustion chamber 17. Note that the ignition plug 25 may be disposed at the exhaust side of the center axis X1 of the cylinder 11. Moreover, the ignition plug 25 may be disposed on the center axis X1 of the cylinder 11.

An intake passage 40 is connected to one side surface of the engine 1. The intake passage 40 communicates with the intake port 18 of each cylinder 11. Gas introduced into the combustion chamber 17 flows through the intake passage 40. An air cleaner 41 is disposed in an upstream end part of the intake passage 40. The air cleaner 41 filters fresh air. A surge tank 42 is disposed near the downstream end of the intake passage 40. Part of the intake passage 40 downstream of the surge tank 42 constitutes independent passages branched from the intake passage 40 for each cylinder 11. The downstream end of each independent passage is connected to the intake port 18 of each cylinder 11.

A throttle valve 43 is disposed between the air cleaner 41 and the surge tank 42 in the intake passage 40. The throttle valve 43 adjusts an introducing amount of the fresh air into the combustion chamber 17 by adjusting an opening of the throttle valve.

A supercharger 44 is also disposed in the intake passage 40, downstream of the throttle valve 43. The supercharger 44 boosts gas to be introduced into the combustion chamber 17. In this example, the supercharger 44 is a mechanical supercharger driven by the engine 1. The mechanical supercharger 44 may be a root, Lysholm, vane, or a centrifugal type.

An electromagnetic clutch 45 is provided between the supercharger 44 and the engine 1. The electromagnetic clutch 45 transmits a driving force from the engine 1 to the supercharger 44 or disengages the transmission of the driving force between the supercharger 44 and the engine 1. As will be described later, an ECU 10 switches the disengagement and engagement of the electromagnetic clutch 45 to switch the supercharger 44 between ON and OFF.

An intercooler 46 is disposed downstream of the supercharger 44 in the intake passage 40. The intercooler 46 cools gas compressed by the supercharger 44. The intercooler 46 may be of a water cooling type or an oil cooling type, for example.

A bypass passage 47 is connected to the intake passage 40. The bypass passage 47 connects an upstream part of the supercharger 44 to a downstream part of the intercooler 46 in the intake passage 40 so as to bypass the supercharger 44 and the intercooler 46. An air bypass valve 48 is disposed in the bypass passage 47. The air bypass valve 48 adjusts a flow rate of gas flowing in the bypass passage 47.

The ECU 10 fully opens the air bypass valve 48 when the supercharger 44 is turned OFF (i.e., when the electromagnetic clutch 45 is disengaged). The gas flowing through the intake passage 40 bypasses the supercharger 44 and is introduced into the combustion chamber 17 of the engine 1. The engine 1 operates in a non-supercharged state, i.e., a natural aspiration state.

When the supercharger 44 is turned ON, the engine 1 operates in a supercharged state. The ECU 10 adjusts an opening of the air bypass valve 48 when the supercharger 44 is turned ON (i.e., when the electromagnetic clutch 45 is engaged). A portion of the gas which passed through the supercharger 44 flows back upstream of the supercharger 44 through the bypass passage 47. When the ECU 10 adjusts the opening of the air bypass valve 48, a supercharging pressure of gas introduced into the combustion chamber 17 changes. Note that the term "supercharging" as used herein refers to a situation where the pressure inside the surge tank 42 exceeds an atmospheric pressure, and "non-supercharging" refers to a situation where the pressure inside the surge tank 42 becomes below the atmospheric pressure.

In this example, a supercharging system 49 is comprised of the supercharger 44, the bypass passage 47, and the air bypass valve 48.

The engine 1 has a swirl generating part which generates a swirl flow inside the combustion chamber 17. As illustrated in FIG. 3, the swirl generating part has a swirl control valve 56 attached to the intake passage 40. Among a primary passage 401 coupled to the first intake port 181 and a secondary passage 402 coupled to the second intake port 182, the swirl control valve 56 is disposed in the secondary passage 402. The swirl control valve 56 is an opening control valve which is capable of choking a cross section of the secondary passage 402. When the opening of the swirl control valve 56 is small, since an intake flow rate of air flowing into the combustion chamber 17 from the first intake port 181 is relatively large, and an intake flow rate of air flowing into the combustion chamber 17 from the second intake port 182 is relatively small, the swirl flow inside the combustion chamber 17 becomes stronger. On the other hand, when the opening of the swirl control valve 56 is large, since the intake flow rates of air flowing into the combustion chamber 17 from the first intake port 181 and the second intake port 182 become substantially equal, the swirl flow inside the combustion chamber 17 becomes weaker. When the swirl control valve 56 is fully opened, the swirl flow will not occur. Note that the swirl flow circulates counterclockwise in FIG. 3, as illustrated by white arrows (also see white arrows in FIG. 2).

An exhaust passage 50 is connected to the other side surface of the engine 1. The exhaust passage 50 communicates with the exhaust port 19 of each cylinder 11. The exhaust passage 50 is a passage through which exhaust gas discharged from the combustion chambers 17 flows. Although detailed illustration is omitted, an upstream part of the exhaust passage 50 constitutes independent passages branched from the exhaust passage 50 for each cylinder 11. The upper end of the independent passage is connected to the exhaust port 19 of each cylinder 11.

An exhaust gas purification system having a plurality of catalytic converters is disposed in the exhaust passage 50. Although illustration is omitted, an upstream catalytic converter is disposed inside an engine bay. The upstream catalytic converter has a three-way catalyst 511 and a GPF (Gasoline Particulate Filter) 512. The downstream catalytic converter is disposed outside the engine bay. The downstream catalytic converter has a three-way catalyst 513. Note that the exhaust gas purification system is not limited to the illustrated configuration. For example, the GPF may be omitted. Moreover, the catalytic converter is not limited to those having the three-way catalyst. Further, the order of the three-way catalyst and the GPF may suitably be changed.

Between the intake passage 40 and the exhaust passage 50, an EGR passage 52 which constitutes an external EGR system is connected. The EGR passage 52 is a passage for recirculating part of the exhaust gas to the intake passage 40. The upstream end of the EGR passage 52 is connected between the upstream catalytic converter and the downstream catalytic converter in the exhaust passage 50. The downstream end of the EGR passage 52 is connected to an upstream part of the supercharger 44 in the intake passage 40. EGR gas flowing through the EGR passage 52 flows into the upstream part of the supercharger 44 in the intake passage 40, without passing through the air bypass valve 48 of the bypass passage 47.

An EGR cooler 53 of water cooling type is disposed in the EGR passage 52. The EGR cooler 53 cools the exhaust gas. An EGR valve 54 is also disposed in the EGR passage 52. The EGR valve 54 adjusts a flow rate of the exhaust gas flowing through the EGR passage 52. By adjusting the opening of the EGR valve 54, an amount of the cooled exhaust gas, i.e., a recirculating amount of external EGR gas can be adjusted.

In this example, an EGR system 55 is comprised of the external EGR system and the internal EGR system. The external EGR system can supply the lower-temperature exhaust gas to the combustion chamber 17 than the internal EGR system.

In FIGS. 1 and 4, an alternator 57 is connected with the crankshaft 15. The alternator 57 is driven by the engine 1. An ECU 10 (described later) can adjust the torque outputted from the engine 1 by increasing the load of the alternator 57.

The control system for the compression ignition engine includes the ECU (Engine Control Unit) 10 for operating the engine 1. The ECU 10 is a controller based on a known microcomputer, and as illustrated in FIG. 4, includes a processor such as a central processing unit (CPU) 101 which executes programs, a memory 102 which is comprised of, for example, RAM (Random Access Memory) and/or ROM (Read Only Memory) and stores the programs and data, and an input/output bus 103 through which an electrical signal is inputted and outputted. The ECU 10 is one example of a controller.

As illustrated in FIGS. 1 and 4, various kinds of sensors SW1-SW17 are connected to the ECU 10. The sensors SW1-SW17 output signals to the ECU 10. The sensors include the following sensors:

Airflow sensor SW1: Disposed downstream of the air cleaner 41 in the intake passage 40, and measures a flow rate of fresh air flowing through the intake passage 40;

First intake-air temperature sensor SW2: Disposed downstream of the air cleaner 41 in the intake passage 40, and measures the temperature of fresh air flowing through the intake passage 40;

First pressure sensor SW3: Disposed downstream of the connected position of the EGR passage 52 in the intake passage 40 and upstream of the supercharger 44, and measures the pressure of gas flowing into the supercharger 44;

Second intake-air temperature sensor SW4: Disposed downstream of the supercharger 44 in the intake passage 40 and upstream of the connected position of the bypass passage 47, and measures the temperature of gas flowed out of the supercharger 44;

Second pressure sensor SW5: Attached to the surge tank 42, and measures the pressure of gas downstream of the supercharger 44;

Pressure sensors SW6: Attached to the cylinder head 13 corresponding to each cylinder 11, and measures the pressure inside each combustion chamber 17;

Exhaust temperature sensor SW7: Disposed in the exhaust passage 50, and measures the temperature of the exhaust gas discharged from the combustion chamber 17;

Linear $O_2$ sensor SW8: Disposed upstream of the upstream catalytic converter in the exhaust passage 50, and measures the oxygen concentration of the exhaust gas;

Lambda $O_2$ sensor SW9: Disposed downstream of the three-way catalyst 511 in the upstream catalytic converter, and measures the oxygen concentration of the exhaust gas;

Water temperature sensor SW10: Attached to the engine 1 and measures the temperature of coolant;

Crank angle sensor SW11: Attached to the engine 1 and measures the rotation angle of the crankshaft 15;

Accelerator opening sensor SW12: Attached to an accelerator pedal mechanism and measures the accelerator opening corresponding to an operating amount of the accelerator pedal;

Intake cam angle sensor SW13: Attached to the engine 1 and measures the rotation angle of an intake cam shaft;

Exhaust cam angle sensor SW14: Attached to the engine 1 and measures the rotation angle of an exhaust cam shaft;

EGR pressure difference sensor SW15: Disposed in the EGR passage 52 and measures a pressure difference between the upstream and the downstream of the EGR valve 54;

Fuel pressure sensor SW16: Attached to the common rail 64 of the fuel supply system 61, and measures the pressure of fuel supplied to the injector 6; and Third intake-air temperature sensor SW17: Attached to the surge tank 42, and measures the temperature of gas inside the surge tank 42, i.e., the temperature of intake air introduced into the combustion chamber 17.

The ECU 10 determines the operating state of the engine 1 based on the signals of the sensors SW1-SW17, and calculates a control amount of each device according to the control logic defined beforehand. The control logic is stored in the memory 102. The control logic includes calculating a target amount and/or the control amount by using a map stored in the memory 102.

The ECU 10 outputs electrical signals according to the calculated control amounts to the injectors 6, the ignition plugs 25, the intake-side electric S-VT 23, the exhaust-side electric S-VT 24, the fuel supply system 61, the throttle valve 43, the EGR valve 54, the electromagnetic clutch 45 of the supercharger 44, the air bypass valve 48, the swirl control valve 56, and the alternator 57.

For example, the ECU 10 sets a target torque of the engine 1 based on the signal of the accelerator opening sensor SW12 and the map, and determines a target supercharging pressure. The ECU 10 then performs a feedback control for adjusting the opening of the air bypass valve 48 based on the target supercharging pressure and the pressure difference before and after the supercharger 44 obtained from the signals of the first pressure sensor SW3 and the second pressure sensor SW5 so that the supercharging pressure becomes the target supercharging pressure.

Moreover, the ECU 10 sets a target EGR rate (i.e., a ratio of the EGR gas to the entire gas inside the combustion chamber 17) based on the operating state of the engine 1 and the map. The ECU 10 then determines a target EGR gas amount based on the target EGR rate and an inhaled air amount based on the signal of the accelerator opening sensor SW12, and performs feedback control for adjusting the opening of the EGR valve 54 based on the pressure difference before and after the EGR valve 54 obtained from the signal of the EGR pressure difference sensor SW15 so that the external EGR gas amount introduced into the combustion chamber 17 becomes the target EGR gas amount.

Further, the ECU 10 performs an air-fuel ratio feedback control when a given control condition is satisfied. For example, the ECU 10 adjusts the fuel injection amount of the injector 6 based on the oxygen concentration of the exhaust gas which is measured by the linear $O_2$ sensor SW8 and the lambda $O_2$ sensor SW9 so that the air-fuel ratio of the mixture gas becomes a desired value.

Note that the details of other controls of the engine 1 executed by the ECU 10 will be described later.

(Concept of SPCCI Combustion)

The engine 1 performs combustion by compressed self-ignition under a given operating state, mainly to improve fuel consumption and emission performance. The combustion by self-ignition varies largely at the timing of the self-ignition, if the temperature inside the combustion chamber 17 before a compression starts is nonuniform. Thus, the engine 1 performs SPCCI combustion which is a combination of SI combustion and CI combustion.

SPCCI combustion is combustion in which the ignition plug 25 forcibly ignites the mixture gas inside the combustion chamber 17 so that the mixture gas carries out SI combustion by flame propagation, and the temperature inside the combustion chamber 17 increases by the heat generation of SI combustion and the pressure inside the combustion chamber 17 increases by the flame propagation so that unburnt mixture gas carries out CI combustion by self-ignition.

By adjusting the heat amount of SI combustion, the variation in the temperature inside the combustion chamber 17 before a compression starts can be absorbed. By the ECU 10 adjusting the ignition timing, the mixture gas can be self-ignited at a target timing.

Figure 5:
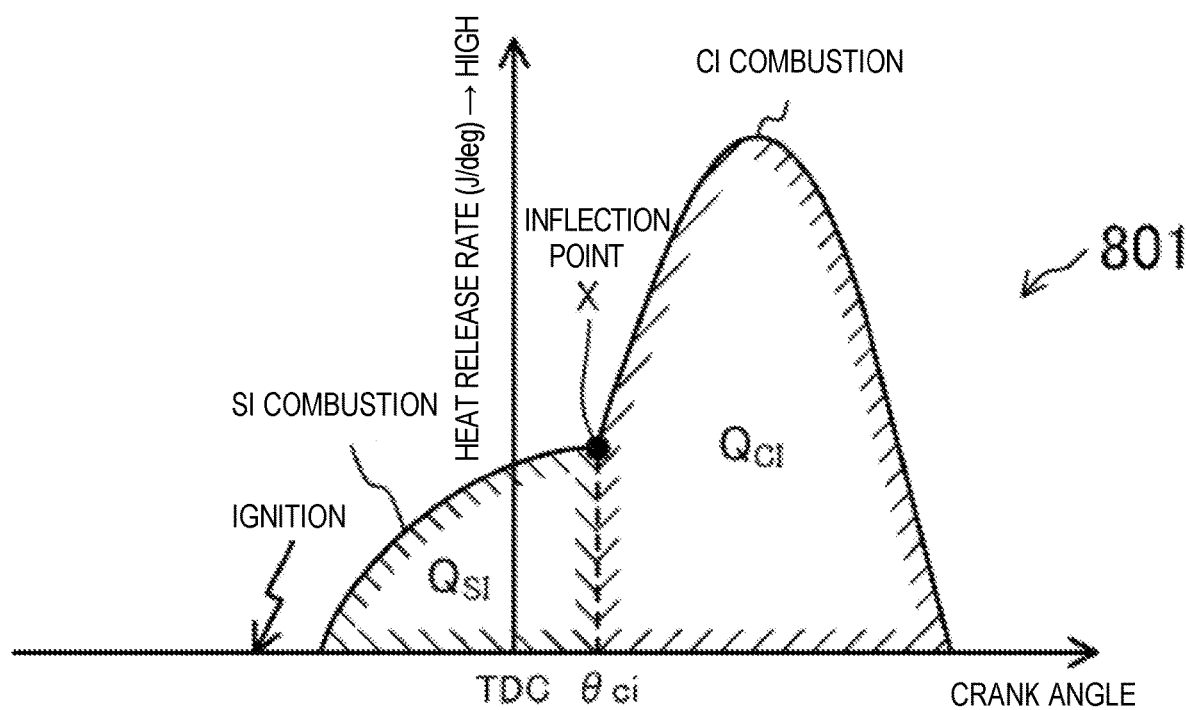
FIG. 5 is a graph illustrating a waveform of SPCCI combustion.

In SPCCI combustion, the heat release of SI combustion is slower than the heat release in CI combustion. As illustrated in FIG. 5, the waveform of the heat release rate of SI combustion in SPCCI combustion is smaller in the rising slope than the waveform in CI combustion. In addition, SI combustion is slower in the pressure fluctuation (dp/dθ) inside the combustion chamber 17 than CI combustion.

When the unburnt mixture gas self-ignites after SI combustion is started, the waveform slope of the heat release rate may become steeper. The waveform of the heat release rate may have an inflection point X at a timing of starting CI combustion (θci).

After the start in CI combustion, SI combustion and CI combustion are performed in parallel. Since CI combustion has a larger heat release than SI combustion, the heat release rate becomes relatively large. However, since CI combustion is performed after a compression top dead center, the waveform slope of the heat release rate does not become too steep. The pressure fluctuation in CI combustion (dp/dθ) also becomes comparatively slow.

The pressure fluctuation (dp/dθ) can be used as an index representing combustion noise. As described above, since SPCCI combustion can reduce the pressure fluctuation (dp/dθ), it is possible to avoid excessive combustion noise. Combustion noise of the engine 1 can be kept below a tolerable level.

SPCCI combustion is completed when CI combustion is finished. CI combustion is shorter in the combustion period than SI combustion. The end timing of SPCCI combustion becomes earlier than SI combustion.

The heat release rate waveform of SPCCI combustion is formed so that a first heat release rate part $Q_{SI}$ formed by SI combustion and a second heat release rate part $Q_{CI}$ formed by CI combustion continue in this order.

Here, a SI ratio is defined as a parameter indicative of a characteristic of SPCCI combustion. The SI ratio is defined as an index related to a ratio of an amount of heat generated by SI combustion to the entire amount of heat generated by SPCCI combustion. The SI ratio is a ratio of amount of heat generated by the two combustions of different combustion forms. When the SI ratio is high, the ratio of SI combustion is high, and on the other hand, when the SI ratio is low, the ratio of CI combustion is high. The SI ratio may be defined as a ratio of the amount of heat generated by SI combustion to the amount of heat generated by CI combustion. That is, if the crank angle at which CI combustion starts in SPCCI combustion is a CI combustion start timing θci, the SI ratio may be equal to $Q_{SI}/Q_{CI}$ (SI ratio=$Q_{SI}/Q_{CI}$) based on an area $Q_{SI}$ of SI combustion on advance side of θci and an area $Q_{CI}$ of CI combustion on retard side including θci, in the waveform 801 illustrated in FIG. 5.

The engine 1 may generate a strong swirl flow inside the combustion chamber 17, when performing SPCCI combustion. In more detail, the engine 1 generates the strong swirl flow inside the combustion chamber 17 when SPCCI combustion of a mixture gas leaner than the stoichiometric air-fuel ratio is carried out. The "strong swirl flow" may be defined as a flow having a swirl ratio of, for example, 4:1 or higher. The swirl ratio can be defined as a value obtained by subtracting an integrated value of measurements of an intake air flow transverse angular velocity for every valve lift by an engine angular velocity. Although illustration is omitted, the intake air flow transverse angular velocity can be obtained based on measurements by using known rig test equipment.

When the strong swirl flow is generated inside the combustion chamber 17, the swirl flow is stronger in the outer circumferential part of the combustion chamber 17, while the swirl flow is relatively weaker in the central part. By the injector 6 injecting fuel into the combustion chamber 17 where the strong swirl flow is formed, the mixture gas can be stratified in which the mixture gas in the central part of the combustion chamber 17 is relatively dense, while the mixture gas in the outer circumferential part is relatively lean.

(Engine Operating Range)

Figure 6:
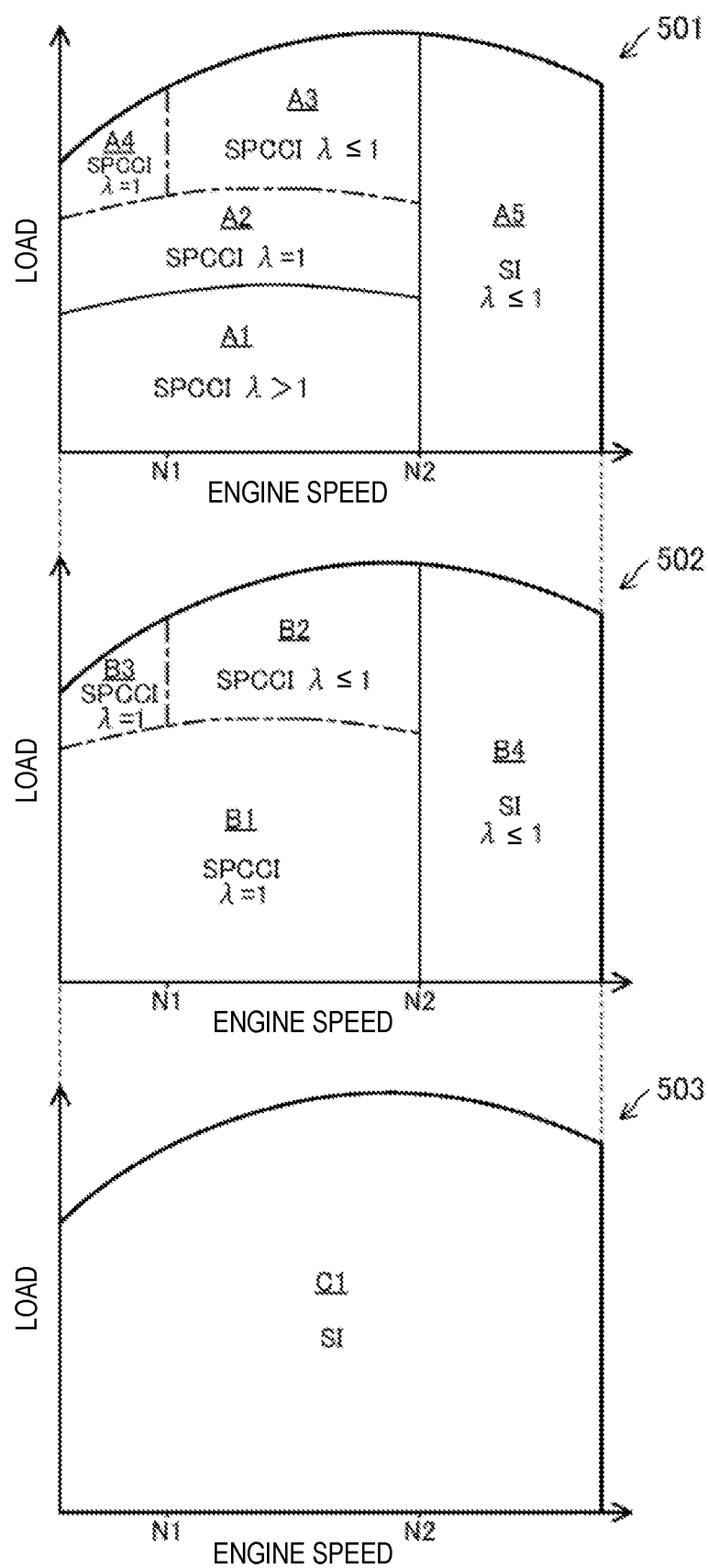
FIG. 6 is a view illustrating maps of the engine, where the top is a map when the engine is warm, the middle is a map when the engine is half-warm, and the bottom is a map when the engine is cold.
Figure 7:
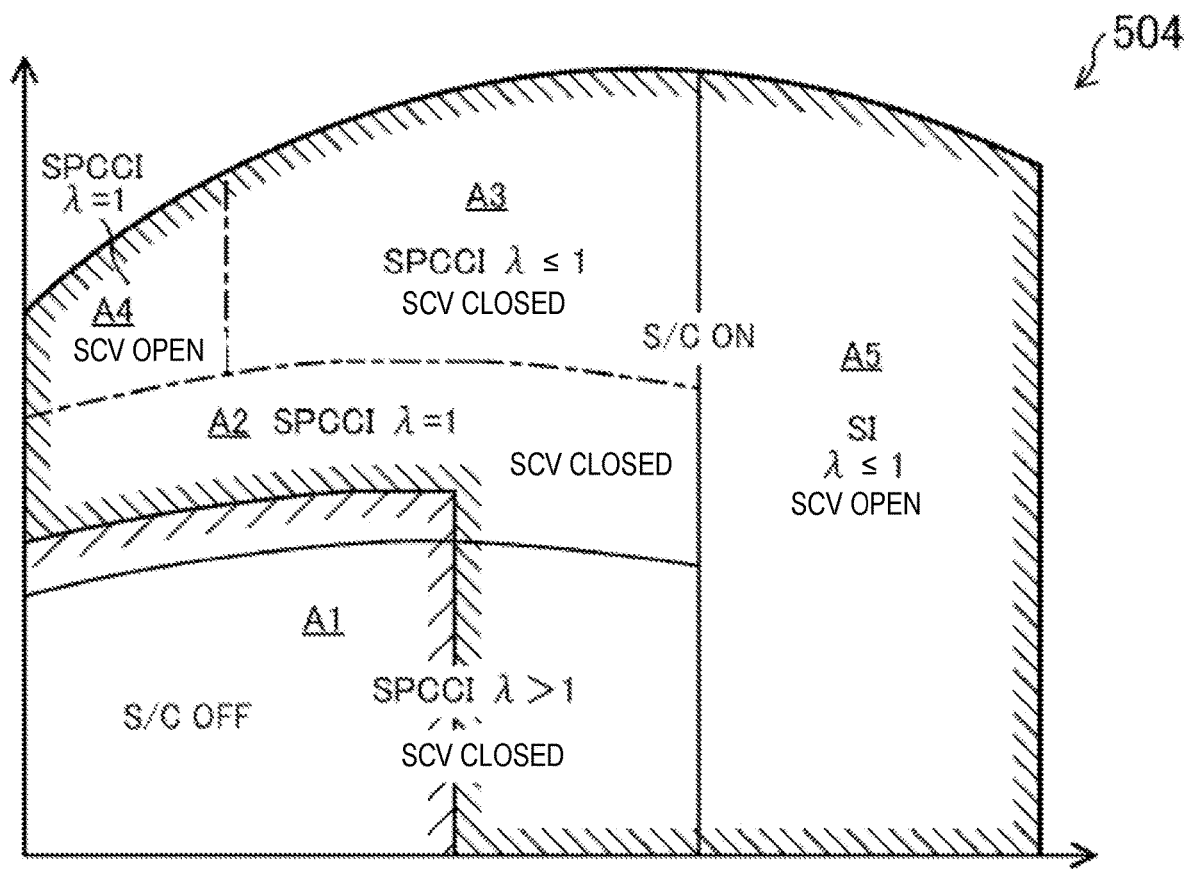
FIG. 7 is a view illustrating details of the map when the engine is warm.

FIGS. 6 and 7 illustrate maps according to the control of the engine 1. The maps are stored in the memory 102 of the ECU 10. The maps include three kinds of maps: a map 501, a map 502, and a map 503. The ECU 10 uses one selected from the three kinds of maps 501, 502, and 503 for the control of the engine 1 according to a wall temperature of the combustion chamber 17 (or an engine water temperature), a temperature of intake air, and the atmospheric pressure. Note that the details of the selection of the three kinds of maps 501, 502, and 503 will be described later.

The first map 501 is a map when the engine 1 is warm. The second map 502 is a map when the engine 1 is half-warm. The third map 503 is a map when the engine 1 is cold.

The maps 501, 502, and 503 are defined by the load and the engine speed of the engine 1. The first map 501 is divided roughly into three areas according to the load and the engine speed. Specifically, the three areas are [1] a low load area A1 which includes idle operation and extends over a low speed range to a middle speed range, [2] middle-and-high load areas A2, A3, and A4 where the load is higher than the low load area A1, [3] a high speed area A5 where the engine speed is higher than the low load area A1, and the middle-and-high load areas A2, A3, and A4. The middle-and-high load areas A2, A3, and A4 are further divided into a middle load area A2, a high-load middle-speed area A3 where the load is higher than the middle load area A2, and a high-load low-speed area A4 where the engine speed is lower than the high-load middle-speed area A3.

The second map 502 is divided roughly into two areas. Specifically, the two areas are [1] low-and-middle speed areas B1, B2, and B3, and [2] a high speed area B4 where the engine speed is higher than the low-and-middle speed areas B1, B2, and B3. The low-and-middle speed area B1, B2, and B3 are further divided into a low-and-middle load area B1 equivalent to the low load area A1 and the middle load area A2, a high-load middle-speed area B2, and a high-load low-speed area B3.

The third map 503 is not divided into a plurality of areas, but has only one area C1.

Here, the low speed area, the middle speed area, and the high speed area may be defined by substantially equally dividing the entire operating range of the engine 1 into three areas in the engine speed direction. In the example of FIG. 6, the engine speed is defined to be a low speed if the engine speed is lower than the engine speed N1, a high speed if the engine speed is higher than or equal to the engine speed N2, and a middle speed if the engine speed is higher than or equal to the engine speed N1 and lower than the engine speed N2. For example, the engine speed N1 may be about 1,200 rpm, and the engine speed N2 may be about 4,000 rpm.

Moreover, the low load area may be an area including an operating state with the light load, the high load area may be an area including an operating state with full load, and the middle load area may be an area between the low load area and the high load area. Moreover, the low load area, the middle load area, and the high load area may be defined by substantially equally dividing the entire operating range of the engine 1 into three areas in the load direction.

The maps 501, 502, and 503 of FIG. 6 illustrate states of the mixture gas and combustion modes in the respective ranges. The map 504 of FIG. 7 corresponds to the first map 501, and illustrates states of the mixture gas and combustion modes in the respective ranges in this map, the opening of the swirl control valve 56 and driving/non-driving ranges of the supercharger 44 in the respective ranges. The engine 1 performs SPCCI combustion in the low load area A1, the middle load area A2, the high-load middle-speed area A3, the high-load low-speed area A4, and the low-and-middle load area B1, the high-load middle-speed area B2, and the high-load low-speed area B3. The engine 1 performs SI combustion in other ranges, such as the high speed area A5, the high speed area B4, and the area C1.

(Operation of Engine in Each Area)

Below, the operation of the engine 1 in each area of the map 504 of FIG. 7 is described in detail.

(Low Load Area)

The engine 1 performs SPCCI combustion when the engine 1 operates in the low load area A1.

In order to improve fuel efficiency of the engine 1, the EGR system 55 introduces the EGR gas into the combustion chamber 17. For example, the intake-side electric S-VT 23 and the exhaust-side electric S-VT 24 are provided with a positive overlap period where both the intake valve 21 and the exhaust valve 22 are opened near an exhaust top dead center. A portion of the exhaust gas discharged from the combustion chamber 17 into the intake port 18 and the exhaust port 19 is re-introduced into the combustion chamber 17. Since the hot exhaust gas is introduced into the combustion chamber 17, the temperature inside the combustion chamber 17 increases. Thus, it becomes advantageous to stabilize SPCCI combustion. Note that the intake-side electric S-VT 23 and the exhaust-side electric S-VT 24 may be provided with a negative overlap period where both the intake valve 21 and the exhaust valve 22 are closed.

Moreover, the swirl generating part forms the strong swirl flow inside the combustion chamber 17. The swirl ratio is four or higher, for example. The swirl control valve 56 is fully closed or at a given opening (closed to some extent). As described above, since the intake port 18 is the tumble port, an inclined swirl flow having a tumble component and a swirl component is formed in the combustion chamber 17.

The injector 6 injects fuel into the combustion chamber 17 a plurality of times during the intake stroke. The mixture gas is stratified by the multiple fuel injections and the swirl flow inside the combustion chamber 17.

The fuel concentration of the mixture gas in the central part of the combustion chamber 17 is denser or richer than the fuel concentration in the outer circumferential part. For example, the air-fuel ratio (A/F) of the mixture gas in the central part is 20:1 or higher and 30:1 or lower, and A/F of the mixture gas in the outer circumferential part is 35 or higher. Note that the value of the A/F is a value when the mixture gas is ignited, and the same applies to the following description. Since the A/F of the mixture gas near the ignition plug 25 is set 20:1 or higher and 30:1 or lower, generation of raw $NO_x$ during SI combustion can be reduced. Moreover, since the A/F of the mixture gas in the outer circumferential part is set to 35 or higher, CI combustion stabilizes.

The A/F of the mixture gas is leaner than the stoichiometric air fuel ratio throughout the combustion chamber 17 (i.e., excess air ratio $\lambda > 1$). For example, the A/F of the mixture gas is between 25:1 and 31:1 or higher throughout the combustion chamber 17. Thus, the generation of raw $NO_x$ can be reduced to improve the emission performance.

After the fuel injection is finished, the ignition plug 25 ignites the mixture gas in the central part of the combustion chamber 17 at a given timing before a compression top dead center. The ignition timing may be during a final stage of the compression stroke. The compression stroke may be equally divided into three, an initial stage, a middle stage, and a final stage, and this final stage may be used as the final stage of the compression stroke described above.

As described above, since the mixture gas in the central part has the relatively high fuel concentration, the ignitability improves and SI combustion by flame propagation stabilizes. By SI combustion being stabilized, CI combustion begins at a suitable timing. Thus, the controllability in CI combustion improves in SPCCI combustion. Further, the generation of the combustion noise is reduced. Moreover, since the A/F of the mixture gas is made leaner than the stoichiometric air fuel ratio to perform SPCCI combustion, the fuel efficiency of the engine 1 can be significantly improved. Note that the low load area A1 corresponds to the Layer 3 described later. The layer 3 extends to the low load operating area and includes the minimum load operating state.

(Middle-to-High Load Area)

When the engine 1 operates in the middle-to-high load area (A2, A3, and A4), the engine 1 also performs SPCCI combustion, similar to the low load area A1.

The EGR system 55 introduces the EGR gas into the combustion chamber 17. For example, the intake-side electric S-VT 23 and the exhaust-side electric S-VT 24 are provided with a positive overlap period where both the intake valve 21 and the exhaust valve 22 are opened near an exhaust top dead center. Internal EGR gas is introduced into the combustion chamber 17. Moreover, the EGR system 55 introduces the exhaust gas cooled by the EGR cooler 53 into the combustion chamber 17 through the EGR passage 52. That is, the external EGR gas with a lower temperature than the internal EGR gas is introduced into the combustion chamber 17. The external EGR gas adjusts the temperature inside the combustion chamber 17 to a suitable temperature. The EGR system 55 reduces the amount of the EGR gas as the engine load increases. The EGR system 55 may not recirculate the EGR gas containing the internal EGR gas and the external EGR gas during the full load.

Moreover, in the middle-to-high load area A2 and the high-load middle-speed area A3, the swirl control valve 56 is fully closed or at a given opening (closed to some extent). On the other hand, in the high-load low-speed area A4, the swirl control valve 56 is open.

The air-fuel ratio (A/F) of the mixture gas is the stoichiometric air fuel ratio (A/F$\approx$14.7:1) throughout the combustion chamber 17. Since the three-way catalysts 511 and 513 purify the exhaust gas discharged from the combustion chamber 17, the emission performance of the engine 1 is improved. The A/F of the mixture gas may be set within a purification window of the three-way catalyst. The excess air ratio λ of the mixture gas may be 1.0±0.2. Note that when the engine 1 operates in the high-load middle-speed area A3 including the full load (i.e., the maximum load), the A/F of the mixture gas may be set at the stoichiometric air fuel ratio or richer than the stoichiometric air fuel ratio (i.e., the excess air ratio λ of the mixture gas is λ≤1) throughout the combustion chamber 17.

Since the EGR gas is introduced into the combustion chamber 17, a gas-fuel ratio (G/F) which is a weight ratio of the entire gas to the fuel in the combustion chamber 17 becomes leaner than the stoichiometric air fuel ratio. The G/F of the mixture gas may be 18:1 or higher. Thus, a generation of a so-called "knock" is avoided. The G/F may be set 18:1 or higher and 30:1 or lower. Alternatively, the G/F may be set 18:1 or higher and 50:1 or lower.

When the load of the engine 1 is the middle load, the injector 6 performs a plurality of fuel injections during an intake stroke. The injector 6 may perform the first injection in the first half of the intake stroke, and may perform the second injection in the second half of the intake stroke.

Moreover, when the load of the engine 1 is the high load, the injector 6 injects fuel in the intake stroke.

The ignition plug 25 ignites the mixture gas at a given timing near a compression top dead center after the fuel injection. When the load of the engine 1 is the middle load, the ignition plug 25 may ignite before the compression top dead center. When the load of the engine 1 is the high load, the ignition plug 25 may ignite after the compression top dead center.

By performing SPCCI combustion with the A/F of the mixture gas being the stoichiometric air-fuel ratio, exhaust gas discharged from the combustion chamber 17 can be purified using the three-way catalysts 511 and 513. Moreover, by introducing EGR gas into the combustion chamber 17 to dilute the mixture gas, the fuel efficiency of the engine 1 improves. Note that the middle-and-high load areas A2, A3, and A4 correspond to Layer 2 described later. Layer 2 extends to the high load area and includes the maximum load operating state.

(Operation of Supercharger)

Here, as illustrated in the map 504 of FIG. 7, the supercharger 44 is OFF (refer to S/C OFF), in a part of the low load area A1 and a part of the middle-and-high load area A2. In detail, the supercharger 44 is OFF in a partial range of the low load area A1 on the low speed side. In a partial range of the low load area A1 on the high speed side, the supercharger 44 is ON in order to secure an intake air filling amount required corresponding to an increase in the engine speed. Moreover, the supercharger 44 is OFF in a partial range of the middle-and-high load area A2 on the low-load low-speed side. The supercharger 44 is ON in a partial range of the middle-and-high load area A2 on the high load side, in order to secure an intake air filling amount required corresponding to an increase in the fuel injection amount. Moreover, the supercharger 44 is ON also in a partial range of the middle-and-high load area A2 on the high speed side.

Note that the supercharger 44 is ON (refer to S/C ON) entirely in the high-load middle-speed area A3, the high-load low-speed area A4, and the high speed area A5.

(High-Speed Area)

As the engine speed increases, a time required for changing the crank angle by 1° becomes shorter. Thus, it becomes difficult to stratify the mixture gas inside the combustion chamber 17. As the engine speed increases, it becomes difficult to perform SPCCI combustion.

Thus, while the engine 1 is operating in the high-speed area A5, the engine 1 performs not SPCCI combustion but SI combustion. Note that the high-speed area A5 stretches entirely in the load direction from low load to high load.

The EGR system 55 introduces EGR gas into the combustion chamber 17. The EGR system 55 reduces an amount of EGR gas as the load increases. The EGR system 55 may make EGR gas zero when the engine is operating with full load.

The swirl control valve 56 is fully open. A swirl flow does not occur inside the combustion chamber 17, but only a tumble flow occurs. By fully opening the swirl control valve 56, it becomes possible to improve the filling efficiency and reduce a pumping loss.

Fundamentally, an air-fuel ratio (A/F) of mixture gas is a stoichiometric air-fuel ratio (A/F≈14.7:1) entirely in the combustion chamber 17. An excess air ratio λ of mixture gas may be set to 1.0±0.2. Note that while the engine 1 is operating with near the full load state, the excess air ratio λ of mixture gas may be less than one.

The injector 6 starts a fuel injection on intake stroke. The injector 6 injects fuel at once. By starting the fuel injection on intake stroke, homogeneous or substantially homogeneous mixture gas is formed inside the combustion chamber 17. Moreover, since a longer vaporizing time of the fuel can be secured, unburnt fuel loss can also be reduced.

The ignition plug 25 ignites the mixture gas at a suitable timing before a compression top dead center after the completion of the fuel injection.

(Layer Structure of Map)

Figure 8:
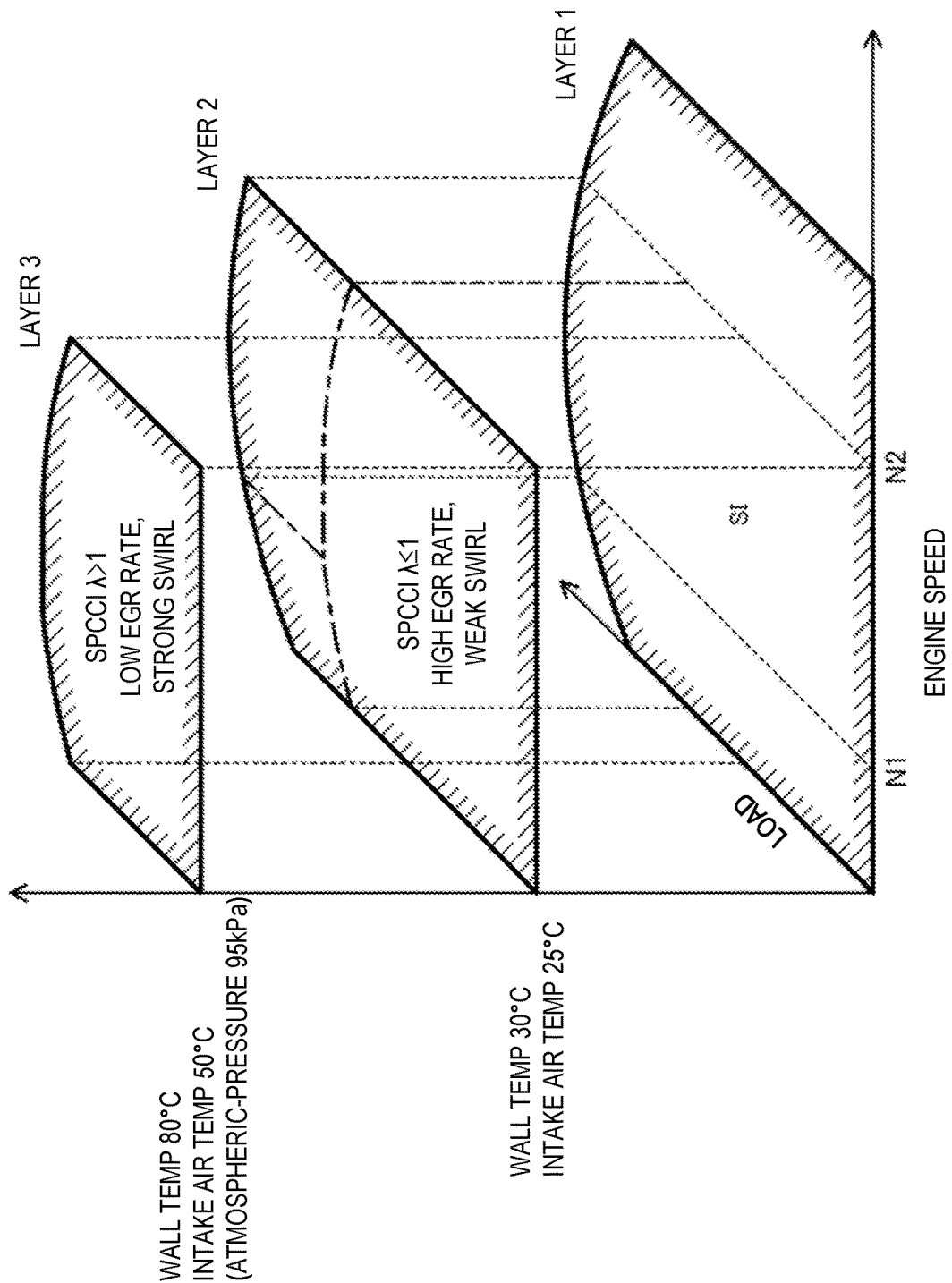
FIG. 8 is a view illustrating a layer structure of the maps of the engine.

The maps 501, 502, and 503 of the engine 1 illustrated in FIG. 6 are comprised of a combination of three layers: Layer 1, Layer 2, and Layer 3, as illustrated in FIG. 8.

Layer 1 is a base layer. Layer 1 extends entirely in the operating range of the engine 1. Layer 1 corresponds to the entire third map 503.

Layer 2 is a layer superimposed on Layer 1. Layer 2 corresponds to a part of the operating range of the engine 1. Specifically, Layer 2 corresponds to the low-and-middle speed areas B1, B2, and B3 of the second map 502.

Layer 3 is a layer superimposed on Layer 2. Layer 3 corresponds to the low load area A1 of the first map 501.

Layer 1, Layer 2, and Layer 3 are selected according to the wall temperature of the combustion chamber 17 (or the engine water temperature), the temperature of intake air, and the atmospheric pressure.

When the atmospheric pressure is higher than a given atmospheric-pressure threshold (e.g., 95 kPa), the wall temperature of the combustion chamber 17 is higher than a given first wall temperature (e.g., 80° C.), and the intake air temperature is higher than a given first intake air temperature (e.g., 50° C.), Layer 1, Layer 2, and Layer 3 are selected, and the first map 501 is formed by piling up these Layer 1, Layer 2, and Layer 3. In the low load area A1 in the first map 501, Layer 3 which is located at the top therein is enabled, in the middle-and-high load area A2, A3, and A4, Layer 2 which is located at the top therein is enabled, and in the high speed area A5, Layer 1 is enabled.

When the wall temperature of the combustion chamber 17 is below the given first wall temperature and higher than a given second wall temperature (e.g., 30° C.), and the intake air temperature is below the given first intake air temperature and higher than a given second intake air temperature (e.g., 25° C.), Layer 1 and Layer 2 are selected. The second map 502 is formed by piling up these Layer 1 and Layer 2. In the low-and-middle speed areas B1, B2, and B3 in the second map 502, Layer 2 which is located at the top therein is enabled, and in the high speed area B4, Layer 1 is enabled.

When the wall temperature of the combustion chamber 17 is below the given second wall temperature, and the intake air temperature is below a given second intake air temperature, only Layer 1 is selected and the third map 503 is formed by Layer 1.

Note that the wall temperature of the combustion chamber 17 may be substituted by, for example, the temperature of the cooling water of the engine 1 measured by the water temperature sensor SW10. Moreover, the wall temperature of the combustion chamber 17 may be estimated based on the temperature of cooling water, or other measurement signals. Moreover, the intake air temperature can be measured by, for example, the third intake air temperature sensor SW17 which measures the temperature inside the surge tank 42. Moreover, the intake air temperature introduced into the combustion chamber 17 may be estimated based on various kinds of measurement signals.

As described above, SPCCI combustion is performed by generating the strong swirl flow inside the combustion chamber 17. Since flame propagates along the wall of the combustion chamber 17 in SI combustion, the flame propagation of SI combustion is influenced by the wall temperature. If the wall temperature is low, the flame of SI combustion is cooled, thereby delaying the timing of the compression ignition.

Since CI combustion in SPCCI combustion is performed in an area from the outer circumferential part to the central part of the combustion chamber 17, it is influenced by the temperature of the central part of the combustion chamber 17. CI combustion becomes unstable if the temperature of the central part is low. The temperature of the central part of the combustion chamber 17 depends on the temperature of the intake air introduced into the combustion chamber 17. That is, the temperature of the central part of the combustion chamber 17 increases as the intake air temperature becomes higher, and decreases as the intake air temperature becomes lower.

When the wall temperature of the combustion chamber 17 is below the given second wall temperature, and the intake air temperature is below the given second intake air temperature, the stable SPCCI combustion cannot be performed. Therefore, only Layer 1 which performs SI combustion is selected, and the ECU 10 operates the engine 1 based on the third map 503. By the engine 1 performing SI combustion in all the operating ranges, the combustion stability can be secured.

When the wall temperature of the combustion chamber 17 is higher than the given second wall temperature and the intake air temperature is higher than the given second intake air temperature, SPCCI combustion of the mixture gas at the substantially stoichiometric air-fuel ratio (i.e., $\lambda \approx 1$) can be stably carried out. Therefore, in addition to Layer 1, Layer 2 is selected, and the ECU 10 operates the engine 1 based on the second map 502. By the engine 1 performing SPCCI combustion in the part of the operating range, the fuel efficiency of the engine 1 improves.

When the wall temperature of the combustion chamber 17 is higher than the given first wall temperature and the intake air temperature is higher than the given first intake air temperature, SPCCI combustion of the mixture gas leaner than the stoichiometric air-fuel ratio can be stably carried out. Therefore, in addition to Layer 1 and Layer 2, Layer 3 is selected, and the ECU 10 operates the engine 1 based on the first map 501. By the engine 1 carrying out SPCCI combustion of the lean mixture gas in the part of the operating range, the fuel efficiency of the engine 1 further improves.

However, if the atmospheric pressure is low, the amount of air delivered to the combustion chamber 17 decreases. Therefore, it becomes difficult to make the mixture gas to the given lean air-fuel ratio. Thus, Layer 3 is selected when the atmospheric pressure is higher than the given atmospheric-pressure threshold.

Next, one example of a control related to the layer selection of the map executed by the ECU 10 is described with reference to a flowchart of FIG. 9. At Step S91 after a start, the ECU 10 first reads the signals of the sensors SW1-SW17. At the subsequent Step S92 the ECU 10 determines whether the wall temperature of the combustion chamber 17 is higher than 30° C., and the intake air temperature is higher than 25° C. If the determination at Step S92 is YES, the process shifts to Step S93, and on the other hand, if NO, the process shifts to Step S95. The ECU 10 selects only Layer 1 at Step S95. The ECU 10 operates the engine 1 based on the third map 503. The process then returns.

At Step S93 the ECU 10 determines whether the wall temperature of the combustion chamber 17 is higher than 80° C., and the intake air temperature is higher than 50° C. If the determination at Step S93 is YES, the process shifts to Step S94, and on the other hand, if NO, the process shifts to Step S96.

The ECU 10 selects Layer 1 and Layer 2 at Step S96. The ECU 10 operates the engine 1 based on the second map 502. The process then returns.

At Step S94, the ECU 10 determines whether the atmospheric pressure is higher than the atmospheric-pressure threshold. If the determination at Step S94 is YES, the process shifts to Step S97, and on the other hand, if NO, the process shifts to Step S96. As described above, the ECU 10 selects Layer 1 and Layer 2 at Step S96.

The ECU 10 selects Layer 1, Layer 2, and Layer 3 at Step S97. The ECU 10 operates the engine 1 based on the first map 501. The process then returns.

Figure 9:
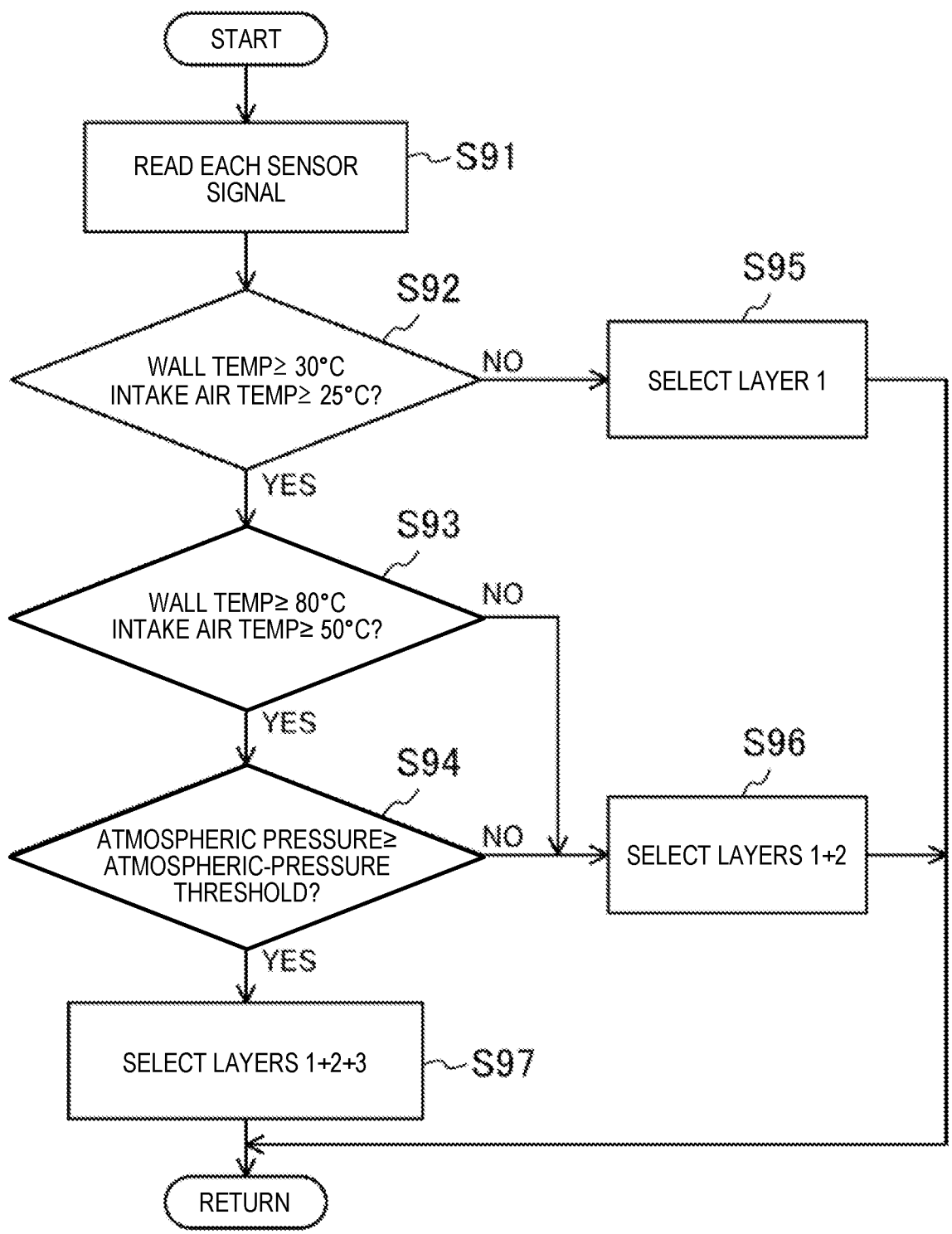
FIG. 9 is a flowchart illustrating a control process according to a layer selection of the maps.
Figure 10:
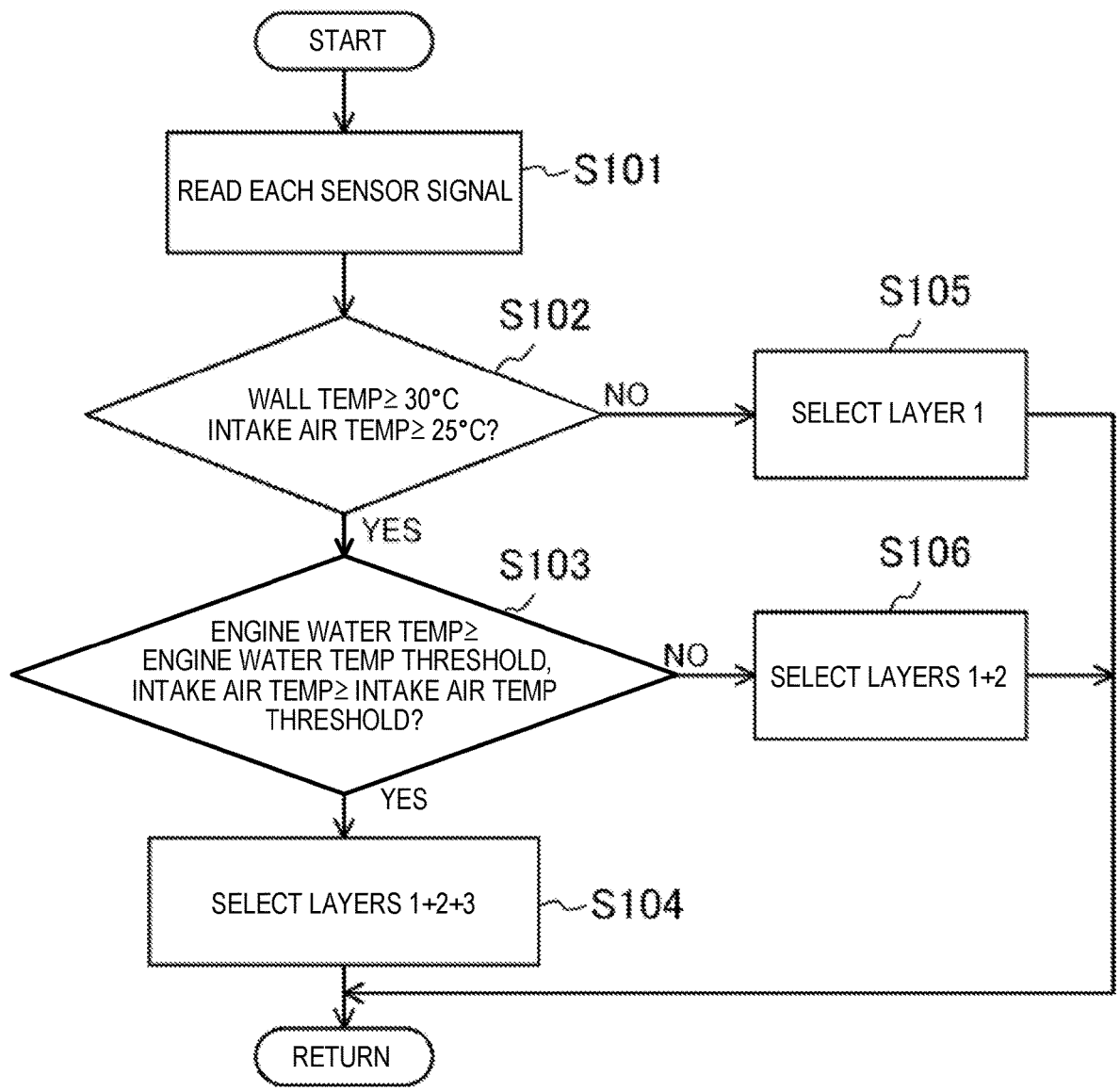
FIG. 10 is a flowchart illustrating a control process according to the layer selection of the maps, different from FIG. 9.

FIG. 10 illustrates a flowchart related to a layer selection different from FIG. 9. At Step S101 after a start, the ECU 10 first reads the signals of the sensors SW1-SW17. At the subsequent Step S102, the ECU 10 determines whether the wall temperature of the combustion chamber 17 is higher than 30° C., and the intake air temperature is higher than 25° C. If the determination at Step S102 is YES, the process shifts to Step S103, and on the other hand, if NO, the process shifts to Step S105. The ECU 10 selects only Layer 1 at Step S105. The process then returns.

At Step S103, the ECU 10 determines whether the engine water temperature is higher than a given engine water temperature threshold, and the intake air temperature is higher than a given intake air temperature threshold.

Figure 11:
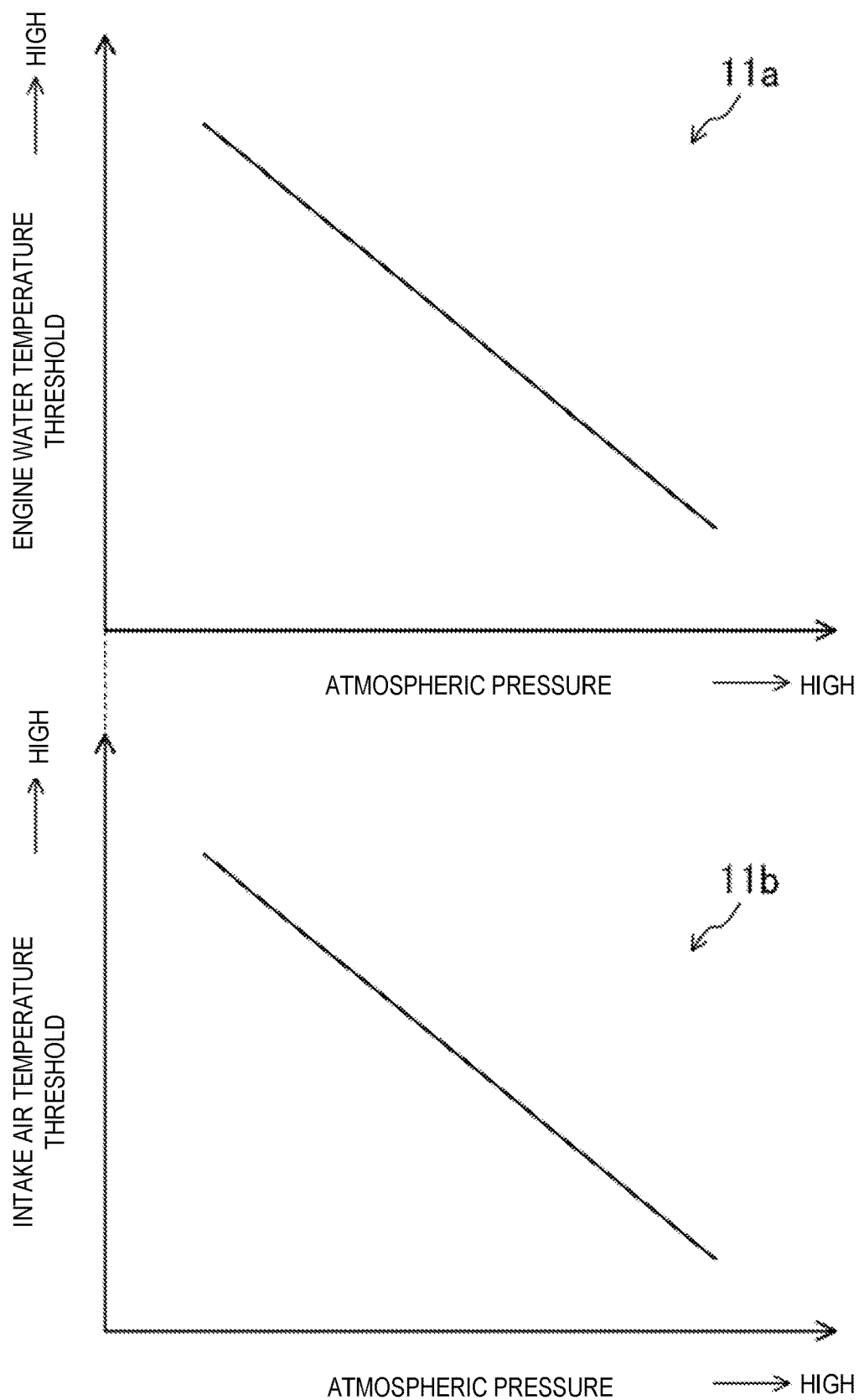
FIG. 11 illustrates relations between an atmospheric pressure and thresholds, where the top is a relation between the atmospheric pressure and an engine water temperature threshold, and the bottom is a relation between the atmospheric pressure and an intake air temperature threshold.

Here, the engine water temperature threshold is set based on the top map 11a illustrated in FIG. 11. The map 11a defines a relation between the atmospheric pressure and the engine water temperature threshold. If the atmospheric pressure is low, the engine water temperature threshold increases, and if the atmospheric pressure is high, the engine water temperature threshold decreases. If the atmospheric pressure is high, the amount of air delivered to the combustion chamber 17 increases, and the in-cylinder temperature increases due to the compression of the in-cylinder gas. Therefore, even if the engine water temperature is relatively low, it becomes possible to carry out SPCCI combustion of the lean mixture gas. Thus, when the atmospheric pressure is high, the engine water temperature threshold is lowered.

Moreover, the bottom map of FIG. 11 illustrates a map 11b which defines the intake air temperature threshold. The map 11b defines a relation between the atmospheric pressure and the intake air temperature threshold, similar to the map 11a. If the atmospheric pressure is low, the intake air temperature threshold increases, and if the atmospheric pressure is high, the intake air temperature threshold decreases. As described above, since the in-cylinder temperature increases if the atmospheric pressure is high, it becomes possible to carry out SPCCI combustion of the lean mixture gas even if the intake air temperature is relatively low. Therefore, the intake air temperature threshold is lowered when the atmospheric pressure is high.

Returning to the flowchart of FIG. 10, if the determination at Step S103 is YES, the process shifts to Step S104, and on the other hand, if NO, the process shifts to Step S106.

The ECU 10 selects Layer 1 and Layer 2 at Step S106. The process then returns.

The ECU 10 selects Layer 1, Layer 2, and Layer 3 at Step S104. The process then returns.

(Basic Control of Engine)

Figure 12:
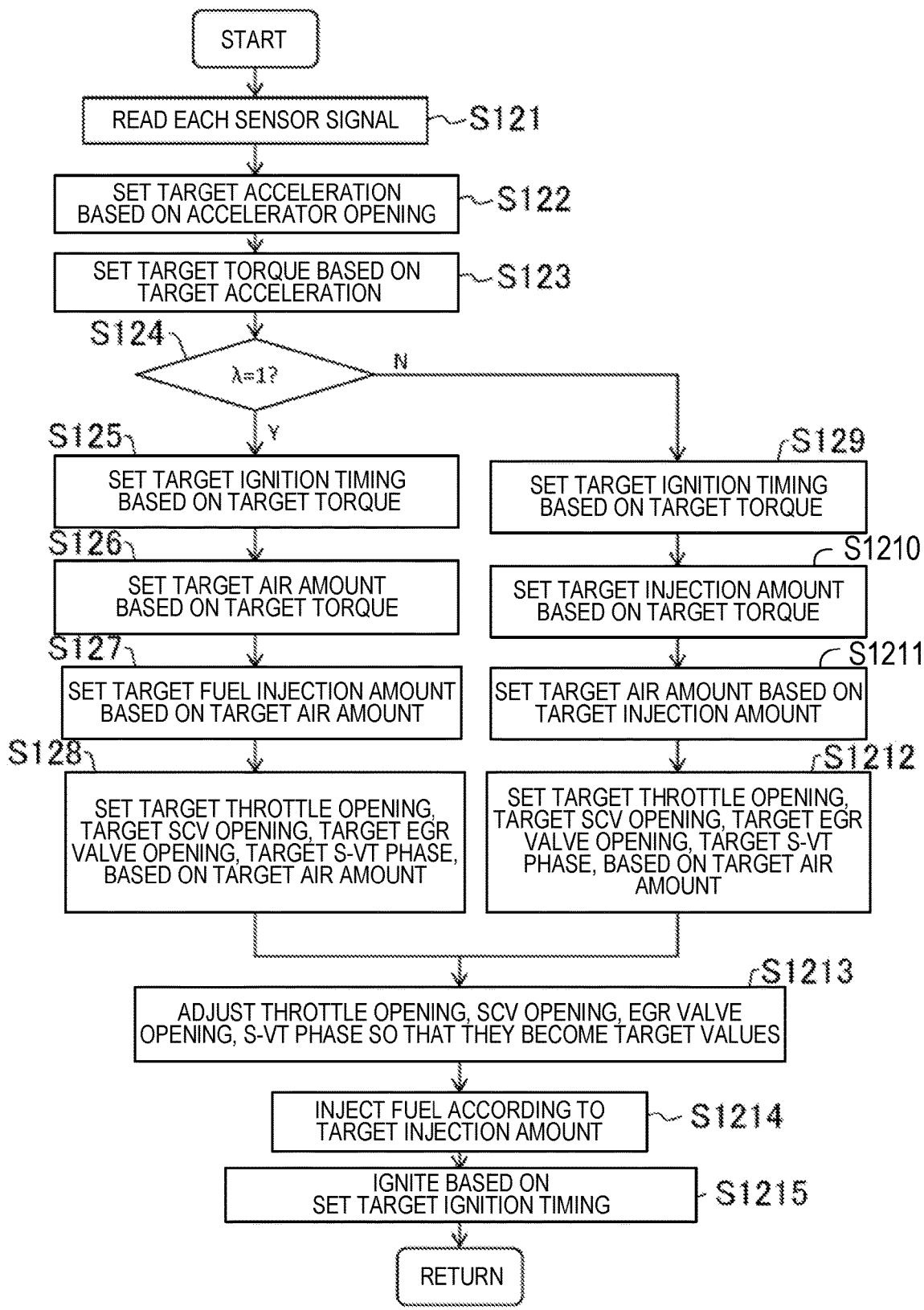
FIG. 12 is a flowchart illustrating a basic control of the engine.

FIG. 12 illustrates a flowchart of a basic control of the engine 1 executed by the ECU 10. The ECU 10 operates the engine 1 according to the control logic stored in the memory 102. Specifically, the ECU 10 determines the operating state of the engine 1 based on the signals of the sensors SW1-SW17, sets the target torque, and calculates for adjustments of the properties inside the combustion chamber 17, the injection amount, the injection timing, and the ignition timing so that the engine 1 outputs the target torque.

The ECU 10 controls SPCCI combustion using two parameters of a SI ratio and θci, when performing SPCCI combustion. Specifically, the ECU 10 defines a target SI ratio and a target θci corresponding to the operating state of the engine 1, and adjusts the temperature inside the combustion chamber 17 and the ignition timing so that an actual SI ratio becomes in agreement with the target SI ratio, and an actual θci becomes in agreement with the target θci. The ECU 10 sets the target SI ratio low when the load of the engine 1 is low, and sets the target SI ratio high when the load of the engine 1 is high. When the load of the engine 1 is low, both the reduction of combustion noise and the improvement of the fuel efficiency are achieved by increasing the ratio of CI combustion in SPCCI combustion. When the load of the engine 1 is high, it becomes advantageous in reducing the combustion noise by raising the ratio of SI combustion in SPCCI combustion.

At Step S121 in the flowchart of FIG. 12, the ECU 10 reads the signals of the sensors SW1-SW17, and at the subsequent Step S122, the ECU 10 sets a target acceleration based on the accelerator opening. At Step S123, the ECU 10 sets a target torque required for realizing the target acceleration setting.

At Step S124, the ECU 10 determines the operating state of the engine 1, and determines whether the air-fuel ratio of the mixture gas is the stoichiometric air-fuel ratio or the substantially stoichiometric air-fuel ratio (i.e., the excess air ratio $\lambda=1$). At Step S124, the ECU 10 determines whether the engine 1 operates in Layer 1 or Layer 2 ($\lambda=1$), or operates in Layer 3 ($\lambda\neq1$). If $\lambda=1$, the process shifts to Step S125, and on the other hand, if $\lambda\neq1$, the process shifts to Step S129.

Steps S125-S128 correspond to steps for setting a target control value of each device, when the engine 1 operates in Layer 1 or Layer 2. At Step S125, the ECU 10 sets a target ignition timing of the ignition plug 25 based on the target torque setting. At the subsequent Step S126, the ECU 10 sets a target amount of air delivered to the combustion chamber 17 based on the target torque setting. At Step S127, the ECU 10 sets a target fuel injection amount based on the target air amount setting so that the air-fuel ratio of the mixture gas becomes the stoichiometric air-fuel ratio or the substantially stoichiometric air-fuel ratio. Then, at Step S128, the ECU 10 sets a target throttle opening of the throttle valve 43, a target SCV opening of the swirl control valve 56, a target EGR valve opening of the EGR valve 54, a target S-VT phase of the intake electric S-VT23, and a target S-VT phase of the exhaust electric S-VT24, based on the target air amount setting.

Steps S129-S1212 correspond to steps for setting the target control value of each device, when the engine 1 operates in Layer 3. At Step S129, the ECU 10 sets the target ignition timing of the ignition plug 25 based on the target torque setting. At the subsequent Step S1210, the ECU 10 sets the target fuel injection amount based on the target torque setting. At Step S1211, the ECU 10 sets the target amount of air delivered to the combustion chamber 17 based on the target injection amount setting so that the air-fuel ratio of the mixture gas becomes the given lean air-fuel ratio. As described above, the air-fuel ratio of the mixture gas is within a range of 25:1 to 31:1. Then, at Step S1212, the ECU 10 sets the target throttle opening of the throttle valve 43, the target SCV opening of the swirl control valve 56, the target EGR valve opening of the EGR valve 54, the target S-VT phase of the intake electric S-VT23, and the target S-VT phase of the exhaust electric S-VT24, based on the target air amount setting.

At Step S1213, the ECU 10 adjusts the throttle opening of the throttle valve 43, the SCV opening of the swirl control valve 56, and the EGR valve opening of the EGR valve 54, the S-VT phase of the intake electric S-VT23, and the S-VT phase of the exhaust electric S-VT24 so that these parameters become the target values set at Step S128 or Step S1212.

At Step S1214, the ECU 10 causes the injector 6 to inject fuel at a given timing according to the target injection amount setting, and at the subsequent Step S1215, the ECU 10 causes the ignition plug 25 to ignite at the set target ignition timing.

(Change Between Layer 2 and Layer 3)

As described above, the engine 1 operates according to the wall temperature of the combustion chamber 17 (or the engine water temperature), the temperature of intake air, and the atmospheric pressure, while performing the selection of Layer 1, Layer 2, and Layer 3. Thus, even if the load and the engine speed are constant, the operation of the engine 1 may be changed between Layer 2 and Layer 3 because the map is changed. Moreover, while the engine 1 operates according to the first map 501, the operation of the engine 1 may be changed between the middle-and-high load areas A2-A4 (i.e., Layer 2) and the low load area A1 (i.e., Layer 3), in connection with the change in the load of the engine 1.

Here, Layer 2 makes the air-fuel ratio of the mixture gas the stoichiometric air-fuel ratio or the substantially stoichiometric air-fuel ratio, and Layer 3 makes the air-fuel ratio of the mixture gas leaner than the stoichiometric air-fuel ratio (i.e., the value of the air-fuel ratio size is increased). Thus, when the operation of the engine 1 changes from Layer 2 to Layer 3, and when changes from Layer 3 to Layer 2, the amount of air delivered to the combustion chamber 17 must be changed. Specifically, when the operation of the engine 1 changes from Layer 2 to Layer 3, the ECU 10 increases the amount of air delivered to the combustion chamber 17 by increasing the opening of the throttle valve 43. On the contrary, when the operation of the engine 1 changes from Layer 3 to Layer 2, the ECU 10 reduces the amount of air delivered to the combustion chamber 17 by reducing the opening of the throttle valve 43.

As the amount of air delivered to the combustion chamber 17 increases when changing from Layer 2 to Layer 3, the air-fuel ratio of the mixture gas is deviated from the stoichiometric air-fuel ratio. On the other hand, since the amount of air delivered to the combustion chamber 17 does not change instantly, the air-fuel ratio of the mixture gas becomes lower than the air-fuel ratio at which the generation of raw $NO_x$ is reduced (i.e., the air-fuel ratio of the mixture gas in Layer 3 (A/F≥25)). Therefore, the air-fuel ratio of the mixture gas is offset from the purification window of the three-way catalyst, and the generation of raw $NO_x$ is not reduced. The exhaust emission performance is reduced during the transition of the operating state of the engine 1 from Layer 2 to Layer 3.

Similarly, during the change from Layer 3 to Layer 2, as the amount of air delivered to the combustion chamber 17 decreases, the air-fuel ratio of the mixture gas is higher than the air-fuel ratio at which the generation of raw $NO_x$ is reduced (i.e., higher than the air-fuel ratio of the mixture gas in Layer 3 (A/F≥25)), and is also deviated from the stoichiometric air-fuel ratio. Since the air-fuel ratio of the mixture gas is offset from the purification window of the three-way catalyst and the generation of raw $NO_x$ is not reduced, the exhaust emission performance is reduced during the transition of the operating state of the engine 1 from Layer 3 to Layer 2.

In order to prevent the decrease of exhaust emission performance, it is possible to maintain the air-fuel ratio of the mixture gas at the stoichiometric air-fuel ratio or the substantially stoichiometric air-fuel ratio during the transition of the operation of the engine 1 between Layer 2 and Layer 3. However, if the air-fuel ratio of the mixture gas is maintained at the stoichiometric air-fuel ratio or the substantially stoichiometric air-fuel ratio based on the actual air amount, there is a disadvantage that the torque of the engine 1 increases because the fuel amount has to be increased more than demanded for the target torque.

Therefore, in the engine 1, a torque adjustment in which the increase in the torque of the engine 1 due to the increase in the fuel amount is performed.

Figure 13:
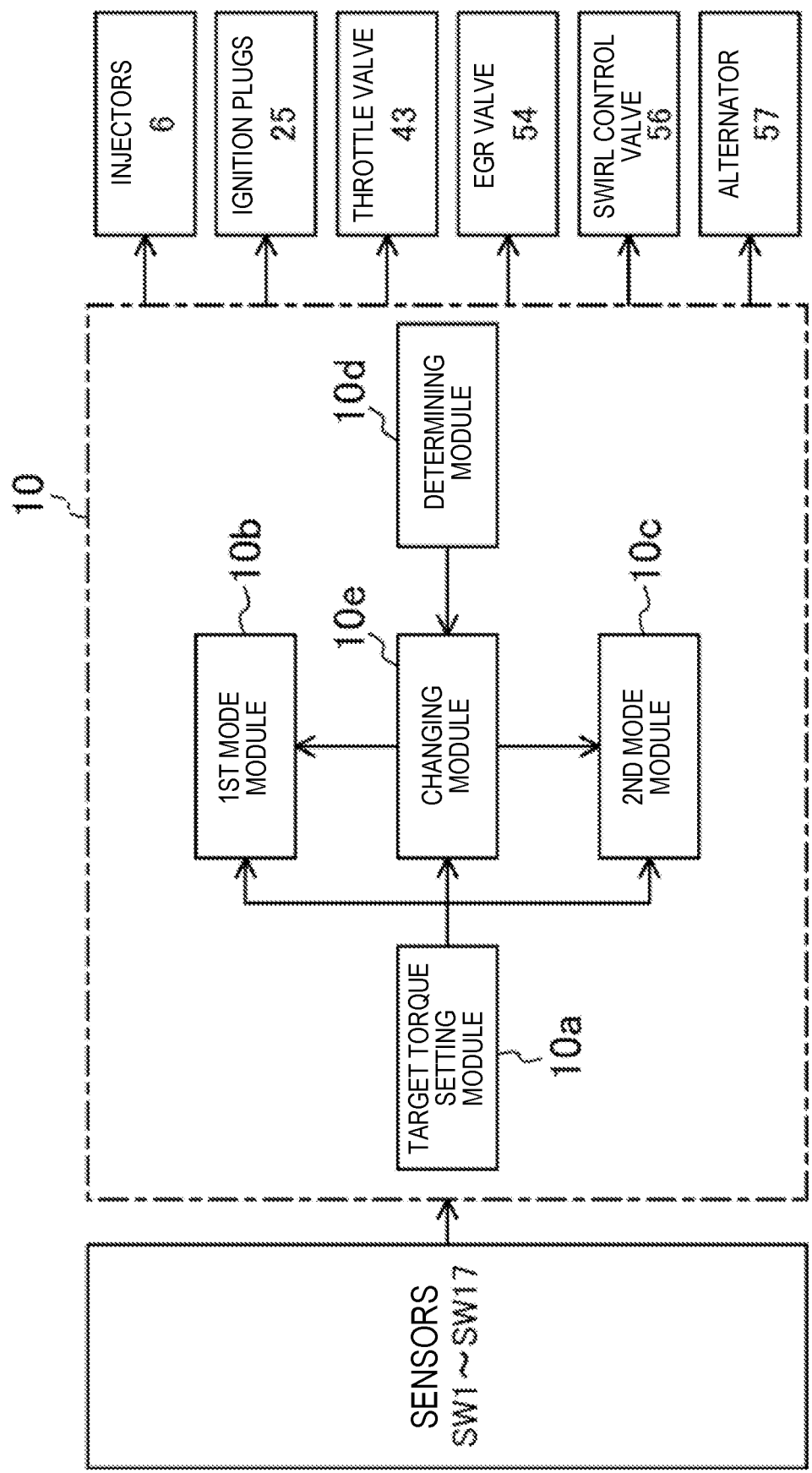
FIG. 13 is a view illustrating one example of a configuration of a functional block of an ECU, according to the changing between Layer 2 and Layer 3.

FIG. 13 illustrates a configuration of the functional blocks of the ECU 10. The functional block illustrated in FIG. 13 mainly relates to the changing between Layer 2 and Layer 3. The functional blocks include a target torque setting module 10*a*, a first mode module 10*b*, a second mode module 10*c*, a determining module 10*d*, and a changing module 10*e*. The ECU 10 is configured to execute the various software modules stored in the memory 102 to perform their respecrtive functions, as described below.

The target torque setting module 10*a* sets the target torque of the engine 1 based on the signals of the sensors SW1-SW17, as described above.

The first mode module 10*b* outputs signals at least to the injector 6, the ignition plug 25, the throttle valve 43, the EGR valve 54, and the swirl control valve 56 based on the target torque set by the target torque setting module 10*a*, and operates the engine 1 by carrying out SPCCI combustion of the mixture gas at the stoichiometric air-fuel ratio or the substantially stoichiometric air-fuel ratio. That is, the first mode module 10*b* operates the engine 1 in Layer 2.

The second mode module 10*c* outputs signals at least to the injector 6, the ignition plug 25, the throttle valve 43, the EGR valve 54, and the swirl control valve 56 based on the target torque set by the target torque setting module 10*a*, and operates the engine 1 by carrying out SPCCI combustion of the mixture gas leaner than the stoichiometric air-fuel ratio. That is, the second mode module 10*c* operates the engine 1 in Layer 3.

The determining module 10*d* determines that the operating state of the engine 1 is changed between Layer 2 and Layer 3. The determining module 10*d* determines whether the change between Layer 2 and Layer 3 is necessary based on the wall temperature (engine water temperature), the intake air temperature, the atmospheric pressure, and the load of the engine 1. The determining module 10*d* outputs the determination result to the changing module 10*e*, when the change is necessary.

In response to the signal from the determining module 10*d*, when the changing between Layer 2 and Layer 3 is necessary, the changing module 10*e* outputs the signals at least to the injector 6, the ignition plug 25, the throttle valve 43, the EGR valve 54, the swirl control valve 56, and the alternator 57 during the change period to operate the engine 1.

Figure 14:
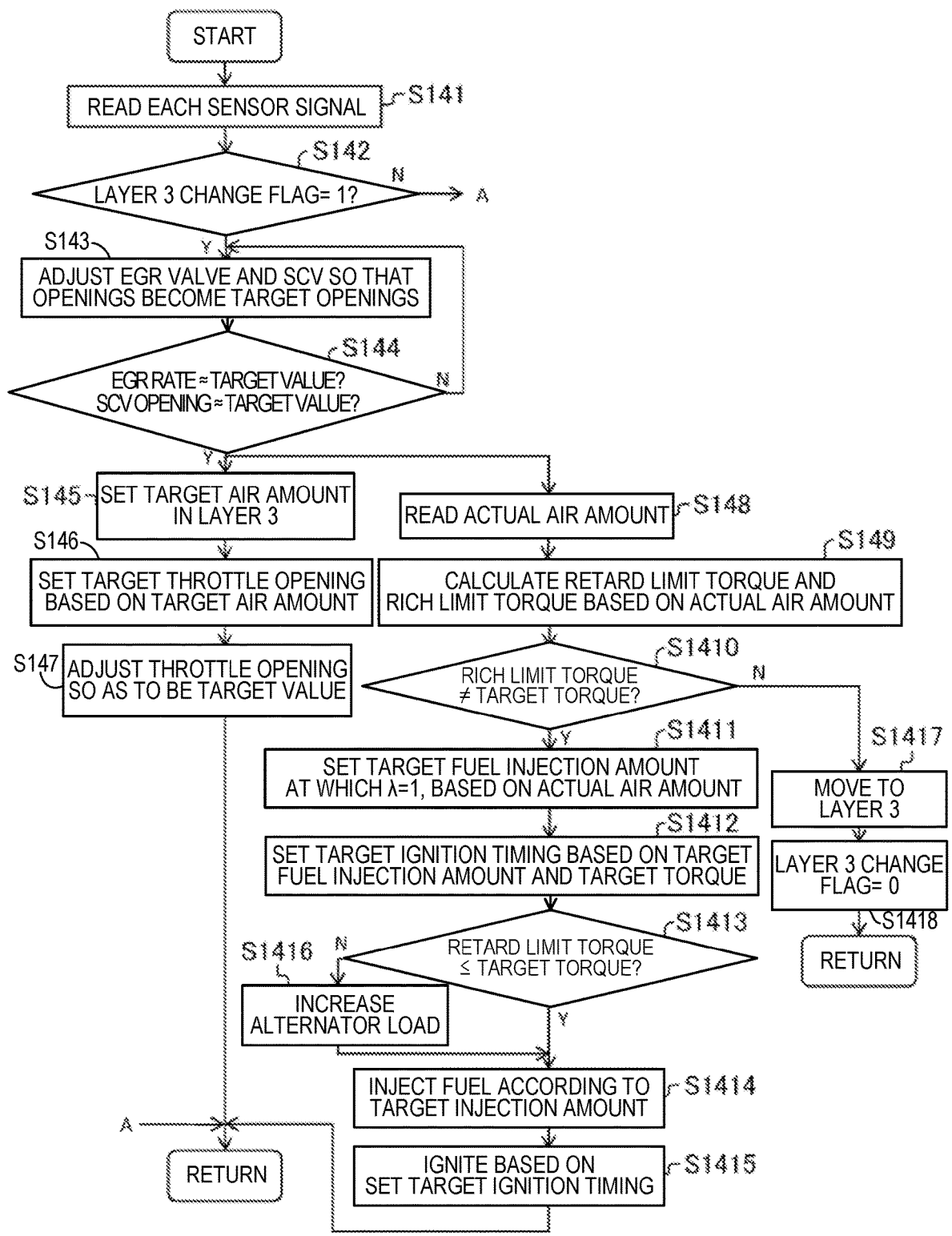
FIG. 14 is a flowchart illustrating a control according to the change from Layer 2 to Layer 3.

FIG. 14 illustrates a flowchart according to the change from Layer 2 to Layer 3. At Step S141, the ECU 10 first reads the signals of the sensors SW1-SW17, and at the subsequent Step S142, the ECU 10 determines whether the change from Layer 2 to Layer 3 is necessary.

Specifically, the determining module 10*d* of the ECU 10 determines whether the change from Layer 2 to Layer 3 is necessary based on the wall temperature (or the engine water temperature), the intake air temperature, and the atmospheric pressure, or determines whether the change from Layer 2 to Layer 3 is necessary because the load of the engine 1 becomes low. As a result of the determination, if the change from Layer 2 to Layer 3 is necessary, the determining module 10*d* sets a Layer 3 change flag to 1. At Step S142, the ECU 10 determines whether the Layer 3 change flag is 1. If the flag is 1 (if the change from Layer 2 to Layer 3 is necessary), the process shifts to Step S143, and on the other hand, if the flag is not 1 (i.e., the flag is 0 and the change from Layer 2 to Layer 3 is not necessary), the process returns.

When changing from Layer 2 to Layer 3, as illustrated in FIG. 8, the air-fuel ratio of the mixture gas becomes leaner than the stoichiometric air-fuel ratio from the stoichiometric air-fuel ratio or the substantially stoichiometric air-fuel ratio, the EGR rate becomes the low EGR rate from the high EGR rate, and the swirl flow becomes then strong swirl from the weak swirl.

At Step S143, the ECU 10 adjusts the opening of the EGR valve 54 so that the opening becomes the target opening. Specifically, the ECU 10 makes the opening of the EGR valve 54 small or zero. The amount of EGR gas introduced into the combustion chamber 17 decreases than before the change. The EGR rate changes from the high EGR rate to the low EGR rate. Moreover, the ECU 10 adjusts the opening of the swirl control valve 56 so that the opening becomes the target opening. Specifically, the ECU 10 makes the opening of the swirl control valve 56 small or zero. The swirl flow changes from the weak swirl to the strong swirl.

At the subsequent Step S144, the ECU 10 determines whether the EGR rate is in substantially agreement with the target value, and the SCV opening is in substantially agreement with the target value. If the determination is NO, the process returns to Step S143, and on the other hand, if the determination is YES, the process shifts to Step S145 and Step S148.

Here, the ECU 10 may determine the EGR rate in the intake manifold based on, for example, an EGR concentration of the exhaust gas obtained from the detection signal of the linear $O_2$ sensor SW8, an EGR gas flow rate calculated from the detection result of the EGR pressure difference sensor SW15 and the opening of the EGR valve 54, and a fresh air amount obtained from the detection result of the airflow sensor SW1.

As will be described later, when changing from Layer 2 to Layer 3, although the opening of the throttle valve 43 is changed from small to large, the combustion stability increases during the transition from Layer 2 to Layer 3 by lessening the amount of EGR gas introduced into the combustion chamber 17 before adjusting the amount of air delivered to the combustion chamber 17. Moreover, before adjusting the amount of air delivered to the combustion chamber 17, the combustion stability increases during the transition from Layer 2 to Layer 3 by strengthening the swirl flow. Even if the ignition timing is retarded as will be described later, a misfire, etc. can be reduced.

Moreover, by changing the opening of the swirl control valve 56 into small from large before adjusting the air amount, the strong swirl flow has already been formed in the combustion chamber 17 when the change to Layer 3 is completed. Thus, after changing to Layer 3, the stable SPCCI combustion of the lean mixture gas can be performed. Note that, the ECU 10 may perform the opening adjustment of the EGR valve 54, the swirl control valve 56, and the throttle valve 43 in parallel.

The process from Step S145 to Step S147 and the process from Step S148 to Step S1418 progress in parallel. The changing module 10e of the ECU 10 performs these processes.

At Step S145, the ECU 10 sets the target air amount in Layer 3, and at the subsequent Step S146, the ECU 10 sets the target throttle opening based on the target air amount setting. Then, at Step S147, the ECU 10 adjusts the opening of the throttle valve 43 so that the opening becomes the target throttle opening setting. Specifically, when changing from Layer 2 to Layer 3, the target air amount increases relatively and the opening of the throttle valve 43 changes from small to large. Note that the amount of air delivered to the combustion chamber 17 does not increase instantly, and a time delay is caused by the time the air amount reaches the target air amount.

At Step S148, the ECU 10 reads the air amount actually delivered to the combustion chamber 17, and at the subsequent Step S149, the ECU 10 calculates a retard limit torque and a rich limit torque based on the read actual air amount.

The retard limit torque is a torque of the engine 1 obtained by carrying out SPCCI combustion of the mixture gas at the stoichiometric air-fuel ratio or the substantially stoichiometric air-fuel ratio in a state where the ignition timing is retarded as much as possible. If the ignition timing is excessively retarded, CI combustion in SPCCI combustion may not occur, or the stability of SI combustion may be reduced. The engine 1 which performs SPCCI combustion has a retard limit of the ignition timing. The retard limit torque corresponds to a lower limit of the engine torque which can be reduced by retarding the ignition timing under a condition where the air-fuel ratio is made at the stoichiometric air-fuel ratio based on the actual air amount. The retard limit torque is an imaginary torque calculated by the ECU 10.

The rich limit torque is a torque of the engine 1 when carrying out SPCCI combustion while increasing the fuel amount to the limit below which raw $NO_x$ is not generated with respect to the actual air amount (note that the air-fuel ratio of the mixture gas is leaner than the stoichiometric air-fuel ratio). The rich limit torque corresponds to an upper limit of the torque to be generated under a condition where the air-fuel ratio is made richer to the generation limit of raw $NO_x$ than the air-fuel ratio setting of Layer 3 based on the actual air amount. The rich limit torque is also an imaginary torque calculated by the ECU 10.

Figure 15:
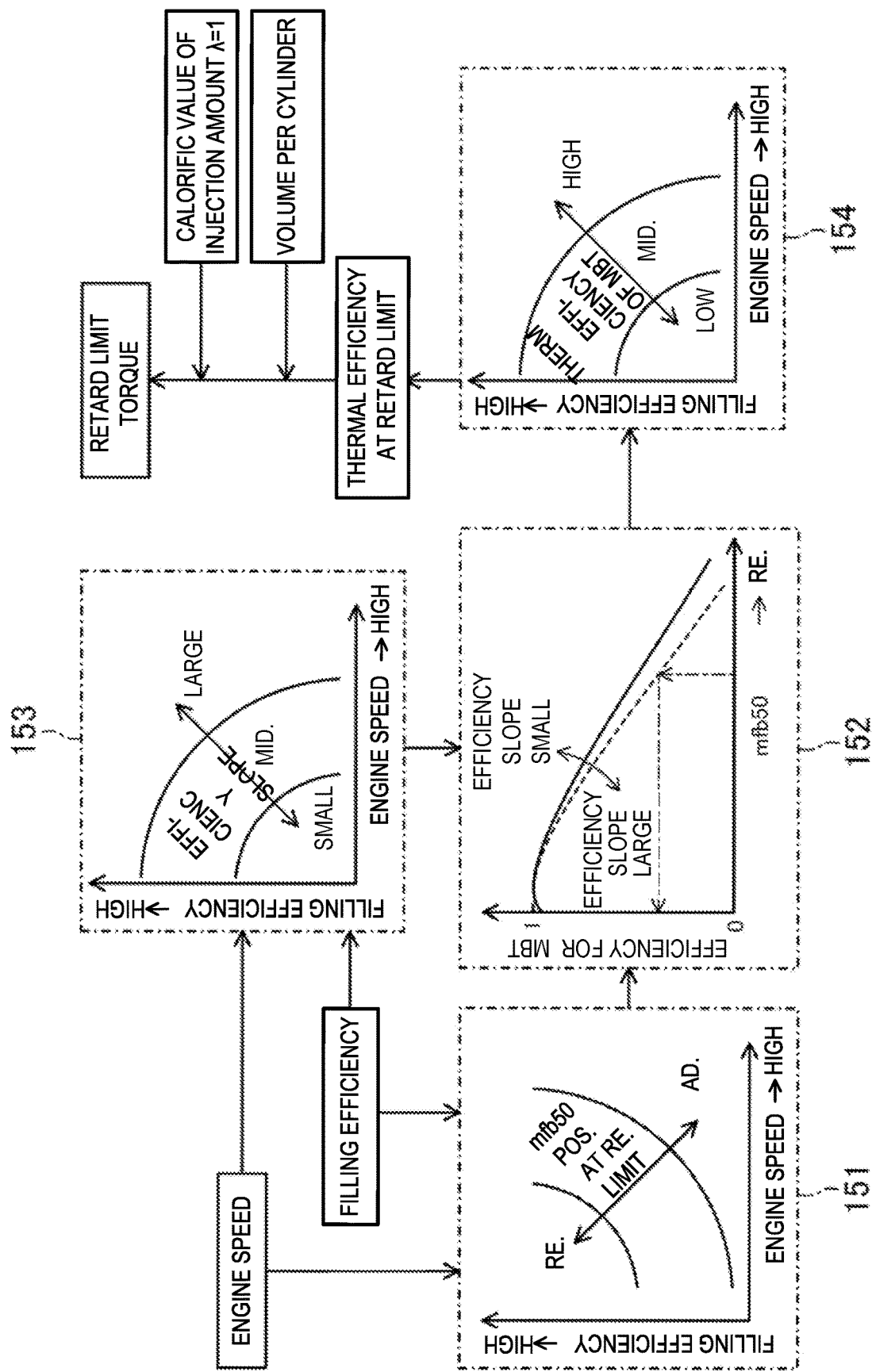
FIG. 15 is a view illustrating a calculation procedure at the retard limit torque.

FIG. 15 is a block diagram illustrating a calculation procedure of the retard limit torque. The ECU 10 calculates the retard limit torque based on the thermal efficiency of the engine 1 at the retard limit. The thermal efficiency of the engine 1 at the retard limit is calculated based on the thermal efficiency of the engine 1 at MBT (Minimum advance for Best Torque), and the mfb50 position at the retard limit. The mfb50 position at the retard limit is a crank angle at which a mass combustion rate (Mass Fraction Burnt: mfb) becomes 50% in a combustion waveform when the ignition timing is retarded as much as possible.

The ECU 10 calculates the mfb50 position at the retard limit based on the engine speed, the filling efficiency, a map 151 determined beforehand. The map 151 defines a relation between the engine operating state (the engine speed, and the filling efficiency, i.e., corresponding to the load of the engine 1), and the mfb50 position at the retard limit. As the engine speed decreases, and the load increases (i.e., the filling efficiency is high), the fuel amount increases and the combustion stability becomes higher, and since a time from an ignition to combustion becomes longer even if the ignition timing is retarded, a misfire etc. can be reduced. The ignition timing can be more retarded as the engine speed decreases and the load increases. The mfb50 position at the retard limit is retarded as the engine speed decreases and the load increases, and is advanced as the engine speed increases and the load decreases (i.e., the filling efficiency is low).

Note that although the mfb50 position at the retard limit is determined using the map 151, the mfb50 position at the retard limit may be calculated using a model in consideration of LNV (Lowest Normalized Value).

The ECU 10 sets an efficiency of MBT based on the mfb50 position at the retard limit and a map 152 determined beforehand. The map 152 defines a relation between the mfb50 position at the retard limit and the efficiency of MBT. The efficiency of MBT becomes "1" if the mfb50 position at the retard limit is a given crank angle on the advance side, and approaches zero as the mfb50 position at the retard limit is retarded.

The map 152 defines a reference curve (refer to a solid line), and this curve is corrected according to the operating state of the engine 1. The map 153 relates to an efficiency slope for correcting the reference curve of the map 152. A map 153 defines a relation of the engine speed, the filling efficiency, and the efficiency slope. The efficiency slope decreases as the engine speed decreases and the load decreases, and increases as the engine speed increases and the load increases.

The reference curve of the map 152 illustrated by the solid line falls downward as the efficiency slope defined based on the map 153 increases, as illustrated by a broken line, and it goes up upward as the efficiency slope decreases. The ECU 10 defines the efficiency of MBT at the retard limit based on the map 152 which is corrected by the efficiency slope (refer to one-dot chain line arrows).

The ECU 10 defines the thermal efficiency at the retard limit based on the efficiency of MBT and a map 154 determined beforehand. The map 154 defines a relation of the engine speed, the filling efficiency, and the thermal efficiency at MBT. The thermal efficiency at MBT decreases as the engine speed decreases and the load decreases, and increases as the engine speed increases and the load increases. The ECU 10 defines the thermal efficiency at MBT in an operating state of the engine 1 based on the engine speed, the filling efficiency, and the map 154, and calculates the thermal efficiency at the retard limit based on the thermal efficiency at MBT and the efficiency of MBT defined in the map 152.

When the thermal efficiency at the retard limit is calculated, the ECU 10 then calculates a torque corresponding to the thermal efficiency concerned (i.e., the retard limit torque) based on the thermal efficiency at the retard limit, a volume per cylinder, and a calorific value of an injection amount at which the air-fuel ratio of the mixture gas becomes the stoichiometric air-fuel ratio or the substantially stoichiometric air-fuel ratio.

Figure 16:
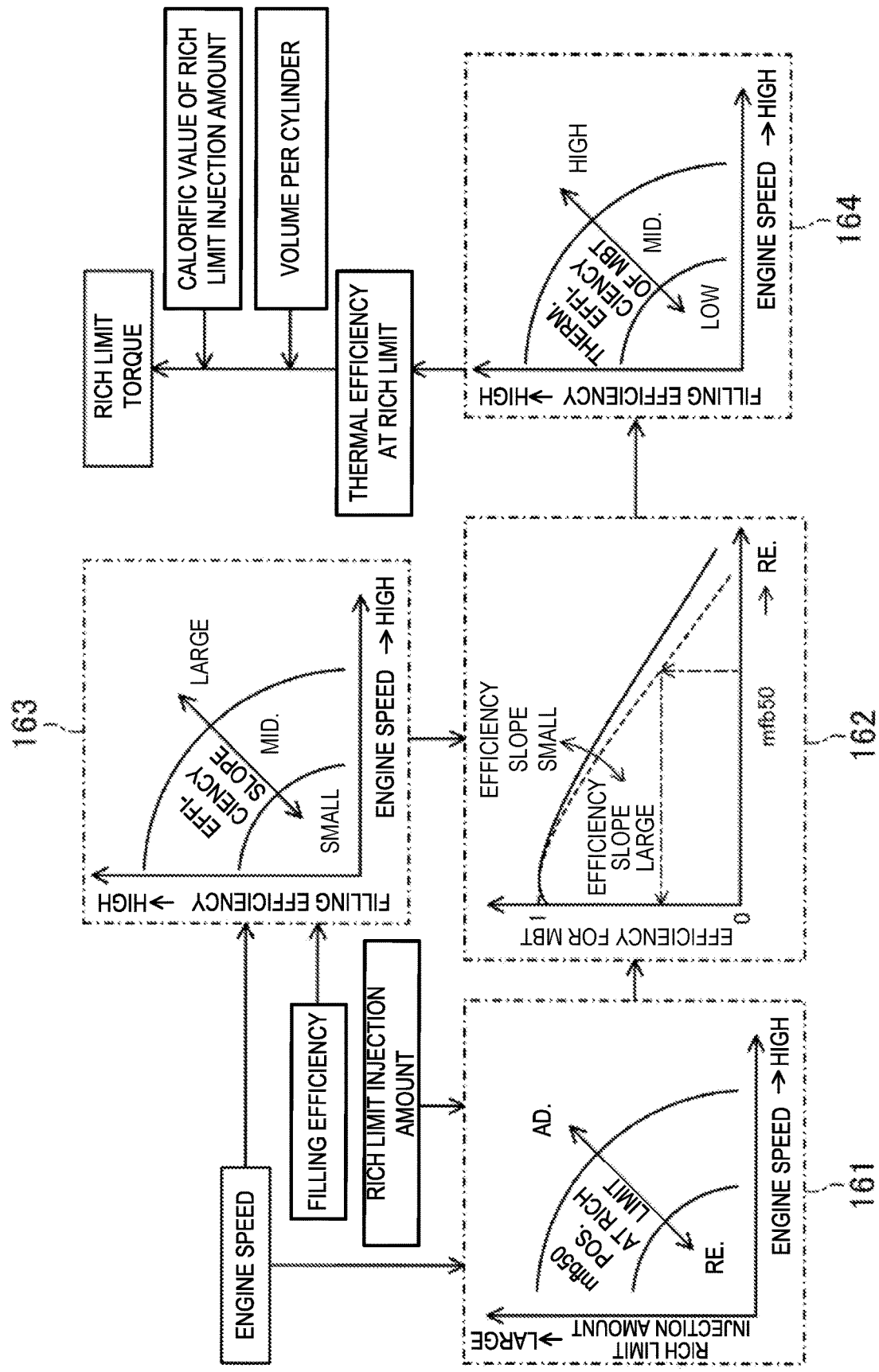
FIG. 16 is a view illustrating a calculation procedure at the rich limit torque.

FIG. 16 is a block diagram illustrating a calculation procedure of the rich limit torque. The ECU 10 calculates the rich limit torque based on the thermal efficiency of the engine 1 at the rich limit. The thermal efficiency of the engine 1 at the rich limit is calculated based on the thermal efficiency of the engine 1 at MBT and the mfb50 position at the rich limit. The mfb50 position at the rich limit indicates a crank angle at which the mass combustion rate becomes 50% in a waveform when the mixture gas of the air-fuel ratio at which the generation of raw $NO_x$ is reduced combusts.

The ECU 10 calculates the mfb50 position at the rich limit based on the engine speed, a rich limit injection amount, and a map 161 determined beforehand. The map 161 defines a relation of the engine speed, the rich limit injection amount, and the mfb50 position. The rich limit injection amount is an upper limit of the injection amount below which the generation of raw NO is reduced. The mfb50 position at the rich limit is retarded as the engine speed decreases and the load decreases, and is advanced as the engine speed increases and the load increases.

A map 162, a map 163, and a map 164 in FIG. 16 are the same as the map 152, the map 153, and the map 154 in FIG. 15, respectively.

The ECU 10 sets the efficiency of MBT based on the mfb50 position at the rich limit and the map 162 determined beforehand (refer to the one-dot chain line arrows).

The reference curve (solid line) of the map 162 is corrected by the efficiency slope which is defined by the map 163 and the operating state of the engine 1.

The ECU 10 defines the thermal efficiency at the rich limit based on the efficiency of MBT and the map 164 determined beforehand. The map 164 defines a relation of the engine speed, the filling efficiency, and the thermal efficiency at MBT.

When the thermal efficiency at the rich limit is calculated, the ECU 10 calculates the torque corresponding to the thermal efficiency concerned (i.e., the rich limit torque) based on the thermal efficiency at the rich limit, the volume per cylinder, and the calorific value of the rich limit injection amount.

Returning to the flowchart of FIG. 14, at Step S1410, the ECU 10 determines whether the calculated rich limit torque is not in agreement with the target torque. If the determination is YES (i.e., if the calculated rich limit torque is not in agreement with the target torque), the process shifts to Step S1411. On the other hand, if the determination is NO (i.e., if the calculated rich limit torque is in agreement with or substantially in agreement with the target torque), the process shifts to Step S1417.

If the determination at Step S1410 is YES, since the amount of air delivered to the combustion chamber 17 is little, the target torque cannot be achieved even if the mixture gas is made richer in fuel to the limit below which raw NO is not produced. Thus, the ECU 10 makes the air-fuel ratio of the mixture gas the stoichiometric air-fuel ratio or the substantially stoichiometric air-fuel ratio, in order to reduce the discharge of NOR. That is, at Step S1411, the ECU 10 sets the target fuel injection amount at which the air-fuel ratio of the mixture gas becomes the stoichiometric air-fuel ratio or the substantially stoichiometric air-fuel ratio based on the actual air amount. The target fuel injection amount set here is increased more than the injection amount required for the engine 1 outputting the target torque.

At the subsequent Step S1412, the target ignition timing is set based on the target fuel injection amount set at Step S1411 and the target torque. The target ignition timing set here is retarded so that the torque amount which is increased by the increase in the fuel amount is reduced. In SPCCI combustion, by retarding the ignition timing, while the timing of SI combustion is retarded, and the timing at which CI combustion starts is also retarded. The torque of the engine 1 can be effectively reduced.

At Step S1413, the ECU 10 determines whether the retard limit torque calculated at Step S149 is below the target torque. If the retard limit torque is below the target torque, the torque of the engine 1 can be reduced to the target torque by retarding the ignition timing. If the determination at Step S1413 is YES, the process shifts to Step S1414. At Step S1414, the ECU 10 causes the injector 6 to inject fuel according to the target injection amount, and at the subsequent Step S1415, the ECU 10 causes the ignition plug 25 to perform ignition according to the target ignition timing setting.

On the other hand, if the determination at Step S1413 is NO (i.e., if the retard limit torque exceeds the target torque), the torque of the engine 1 exceeds the target torque, even if the ignition timing is retarded to the retard limit. The torque of the engine 1 cannot be reduced only by retarding the ignition timing when changing from Layer 2 to Layer 3, thereby causing a torque shock.

Therefore, if the determination at Step S1413 is NO, the process shifts to Step S1416 where the ECU 10 increases the load of the alternator. Thus, the torque of the engine 1 is decreased to reduce the generation of the torque shock.

The process repeats Steps S1411 to S1416 until the determination at Step S1410 becomes NO. If the amount of air delivered to the combustion chamber 17 increases and the calculated rich limit torque becomes in agreement with or substantially in agreement with the target torque, the determination at Step S1410 becomes NO, and the process then shifts to Step S1417.

At Step S1417, the ECU 10 performs the transition to Layer 3. Specifically, the ECU 10 reduces the injection amount which was increased so that the air-fuel ratio of the mixture gas becomes leaner than the stoichiometric air-fuel ratio. The injection amount becomes the injection amount corresponding to the target torque. Moreover, the ECU 10 advances the ignition timing which was retarded.

At the subsequent Step S1418, the ECU 10 sets the Layer 3 change flag to 0, and therefore, the change from Layer 2 to Layer 3 is completed.

Figure 17:
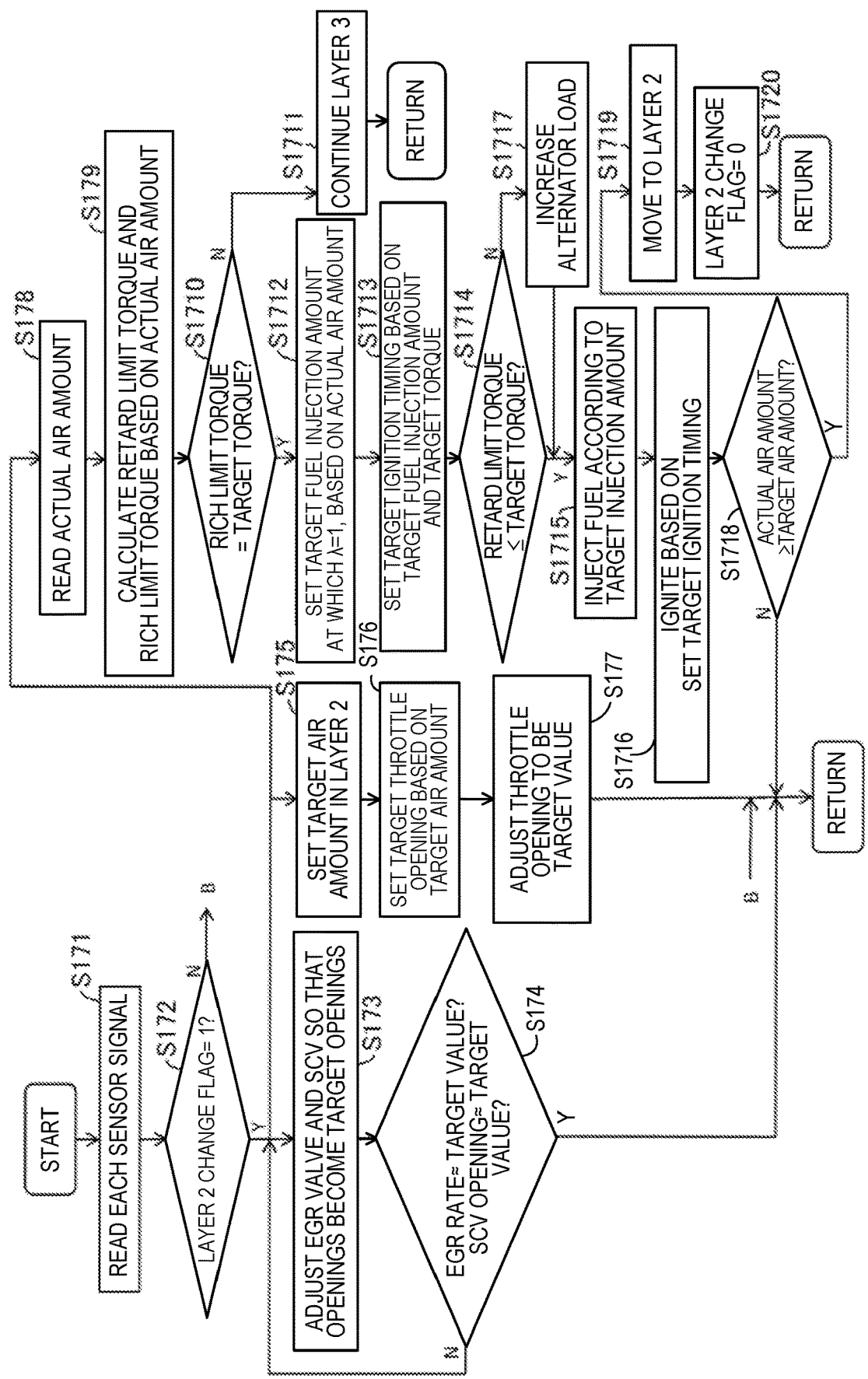
FIG. 17 is a flowchart illustrating a control according to the change from Layer 3 to Layer 2.

FIG. 17 illustrates a flowchart according to the change from Layer 3 to Layer 2. At Step S171, the ECU 10 first reads the signals of the sensors SW1-SW18, and at the subsequent Step S172, the ECU 10 determines whether the change from Layer 3 to Layer 2 is necessary.

Specifically, the determining module 10d of the ECU 10 determines whether the change from Layer 3 to Layer 2 is necessary based on the wall temperature (or the engine water temperature), the intake air temperature, and the atmospheric pressure, or whether the change from Layer 3 to Layer 2 is necessary because the load of the engine 1 is increased. As a result of the determination, if the change from Layer 3 to Layer 2 is necessary, the determining module 10d sets a Layer 2 change flag to 1. At Step S172, the ECU 10 determines whether the Layer 2 change flag is 1, and if the flag is 1 (if the change from Layer 3 to Layer 2 is necessary), the process shifts to Step S173, S175, and S178, and on the other hand, if the flag is not 1 (i.e., the flag is 0 and the change from Layer 3 to Layer 2 is not necessary), the process returns.

When changing from Layer 3 to Layer 2, as illustrated in FIG. 8, the air-fuel ratio of the mixture gas becomes the stoichiometric air-fuel ratio or the substantially stoichiometric air-fuel ratio from the air-fuel ratio leaner than the stoichiometric air-fuel ratio, the EGR rate becomes the high EGR rate from the low EGR rate, and the swirl flow becomes the weak swirl from the strong swirl.

Steps S173 and S174 are processes according to the opening adjustments of the EGR valve 54 and the swirl control valve 56, Steps S175 to S177 are a process according to the opening adjustment of the throttle valve 43, and Steps S178 to S1720 is a process according to the change determination from Layer 3 to Layer 2. These three processes progress in parallel. The changing module 10e performs these processes.

At Step S173, the ECU 10 adjusts the opening of the EGR valve 54 so that the opening becomes the target opening. Specifically, the ECU 10 makes the opening of the EGR valve 54 from small to large. Thus, the amount of EGR gas introduced into the combustion chamber 17 increases to be more than before the change. The EGR rate changes from the low EGR rate to the high EGR rate. Moreover, the ECU 10 adjusts the opening of the swirl control valve 56 so that the opening becomes the target opening. Specifically, the ECU 10 makes the opening of the swirl control valve 56 from small to large. The swirl flow changes from the strong swirl to the weak swirl. Since Layer 2 carries out SPCCI combustion of the mixture gas at the stoichiometric air-fuel ratio or the substantially stoichiometric air-fuel ratio, it is easier to secure the combustion stability as compared with Layer 3. Therefore, unlike the changing from Layer 2 to Layer 3, the opening adjustment of the EGR valve 54 and the opening adjustment of the swirl control valve 56 are permitted to be performed simultaneously with the opening adjustment of the throttle valve 43 described later.

Note that similar to the changing from Layer 2 to Layer 3, the opening adjustments of the EGR valve 54 and the swirl control valve 56 may be performed first, and the opening adjustment of the throttle valve 43 may then be performed.

At Step S174, the ECU 10 determines whether the EGR rate is in substantially agreement with the target value, and the SCV opening is in substantially agreement with the target value. If the determination is NO, the process returns to Step S173. On the other hand, if the determination is YES, the opening adjustment of the EGR valve 54 and the opening adjustment of the swirl control valve 56 are completed.

At Step S175, the ECU 10 sets the target air amount in Layer 2, and at the subsequent Step S176, the ECU 10 sets the target throttle opening based on the target air amount setting. Then, at Step S177, the ECU 10 adjusts the opening of the throttle valve 43 so that the opening becomes the target throttle opening setting. Specifically, when changing from Layer 3 to Layer 2, the target air amount decreases relatively and the opening of the throttle valve 43 changes from large to small. Note that the amount of air delivered to the combustion chamber 17 does not decrease instantly, and a time delay occurs until the air amount decreases to the target air amount.

At Step S178, the ECU 10 reads the air amount actually delivered to the combustion chamber 17, and at the subsequent Step S179, the ECU 10 calculates the retard limit torque and the rich limit torque based on the read actual air amount. The calculation of the retard limit torque and the rich limit torque is the same as the above.

At Step S1710, the ECU 10 determines whether the calculated rich limit torque is in agreement with the target torque. If the determination is NO (i.e., if the calculated rich limit torque is not in agreement with the target torque), the process shifts to Step S1711.

At Step S1711, the ECU 10 continues Layer 3. The injection amount is maintained, while the air amount actually delivered to the combustion chamber 17 is decreased. The air-fuel ratio of the mixture gas decreases. By continuing Layer 3 until it reaches the rich limit, since the increase in the injection amount and the retarding of the ignition timing can be suppressed while reducing the generation of raw NOR, it becomes advantageous for improving the fuel efficiency.

If the determination at Step S1710 is YES (i.e., if the calculated rich limit torque is in agreement with or substantially in agreement with the target torque), the air-fuel ratio of the mixture gas decreases when the amount of air delivered to the combustion chamber 17 is decreased more, thereby generating raw NOR. In order to make the air-fuel ratio of the mixture gas at the stoichiometric air-fuel ratio or the substantially stoichiometric air-fuel ratio, the process shifts to Step S1712.

At Step S1712, the ECU 10 sets the target fuel injection amount at which the air-fuel ratio of the mixture gas becomes the stoichiometric air-fuel ratio or the substantially stoichiometric air-fuel ratio, based on the actual air amount. The target fuel injection amount set here is increased more than the injection amount required for the engine outputting the target torque.

At the subsequent Step S1713, the target ignition timing is set based on the target fuel injection amount set at Step S1712, and the target torque. The target ignition timing set here is retarded so that the torque which is increased by the increase in the fuel amount is reduced.

At Step S1714, the ECU 10 determines whether the retard limit torque calculated at Step S179 is below the target torque. If the retard limit torque is below the target torque, the torque of the engine 1 can be reduced to the target torque by retarding the ignition timing. If the determination at Step S1714 is YES, the process shifts to Step S1715. At Step S1715, the ECU 10 causes the injector 6 to inject fuel according to the target injection amount, and at the subsequent Step S1716, the ECU 10 causes the ignition plug 25 to perform ignition according to the ignition timing setting.

If the determination at Step S1714 is NO, the torque of the engine 1 cannot be reduced to the target torque only by retarding the ignition timing. If the determination at Step S1714 is NO, the process shifts to Step S1717. At Step S1717, the ECU 10 increases the load of the alternator 57 to reduce the torque of the engine 1. Thus, the generation of the torque shock can be controlled. The process then shifts from Step S1717 to Step S1715.

At Step S1718 after Step S1716, the ECU 10 determines whether the amount of air delivered to the combustion chamber 17 decreases and the actual air amount reaches the target air amount. If the determination at Step S1718 is NO, the process returns. The change control from Layer 3 to Layer 2 is continued. If the determination at Step S1718 is YES, the process shifts to Step S1719. At Step S1719, the ECU 10 performs the transition to Layer 2. That is, the ECU 10 ends the increasing of the injection amount and the retarding of the ignition timing. At the subsequent Step S1720, the ECU 10 sets the Layer 2 change flag to 0, and the change from Layer 3 to Layer 2 is completed.

Next, the changing between Layer 2 and Layer 3 is described with reference to time charts illustrated in FIGS. 18 to 20. In these time charts, time goes from the left to the right. Moreover, in the changing between Layer 2 and Layer 3, the target torque of the engine 1 is assumed to be constant or substantially constant, without being changed.

Figure 18:
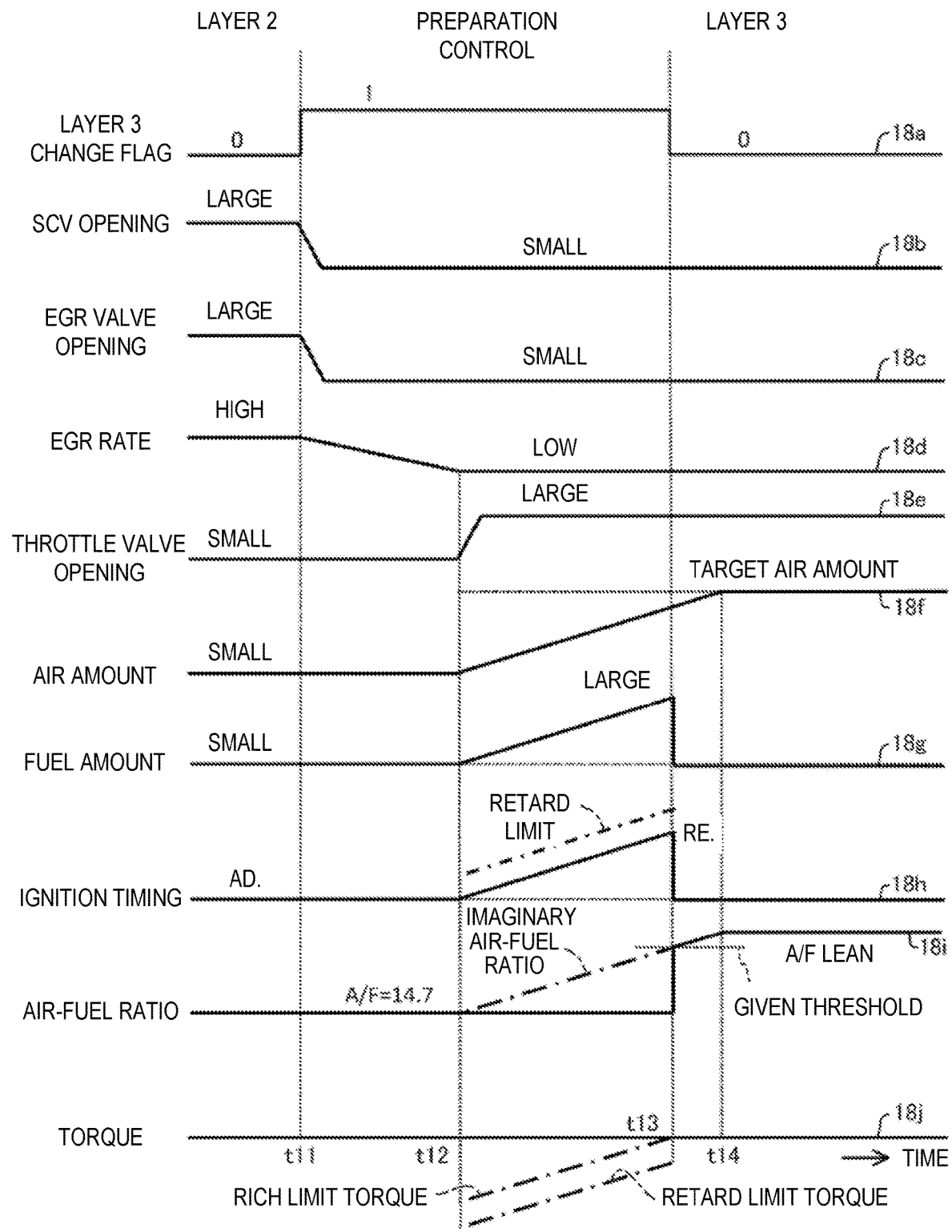
FIG. 18 is a time chart illustrating a change in each parameter when changing from Layer 2 to Layer 3.

FIG. 18 illustrates the change in each parameter when changing from Layer 2 to Layer 3. When the Layer 3 change flag is changed to 1 at a time t11 (refer to 18a), the openings of the swirl control valve 56 and the EGR valve 54 change from large to small (refer to 18b and 18c). The swirl flow inside the combustion chamber 17 changes from the weak swirl to the strong swirl, and the EGR rate in the intake manifold changes from the high EGR rate to the low EGR rate (refer to 18d).

When the EGR rate reaches the given target value at a time t12, the opening of the throttle valve 43 changes from small to large (refer to 18e). As described above, by performing the opening adjustments of the EGR valve 54 and the swirl control valve 56 before the opening adjustment of the throttle valve 43, it becomes possible to stably perform SPCCI combustion of the lean mixture gas when changed to Layer 3.

When the opening of the throttle valve 43 increases, the amount of air delivered to the combustion chamber 17 increases gradually (refer to 18f). The fuel injection amount increases corresponding to the increase in the air amount (refer to 18g). Thus, the air-fuel ratio of the mixture gas is maintained at the stoichiometric air-fuel ratio or the substantially stoichiometric air-fuel ratio (refer to 18i). Here, if the fuel injection amount is assumed to be a fixed injection amount corresponding to the target torque of the engine 1, the air-fuel ratio (i.e., the imaginary air-fuel ratio) increases gradually with the increase in the air amount, as illustrated by a one-dot chain line part of 18i. That is, raw $NO_x$ is generated.

Since the fuel injection amount is increased, the ignition timing is retarded so that the torque of the engine 1 does not become larger than the target torque (refer to 18h). The retarding amount of the ignition timing increases in connection with the increase in the air amount and the fuel amount. By performing the torque adjustment so that the torque of the engine 1 decreases, it becomes possible to make the torque of the engine 1 constant (refer to 18j).

In the example illustrated in FIG. 18, since the retard limit torque is lower than the target torque, the torque of the engine 1 can be lowered to the target torque without retarding the ignition timing to the retard limit (refer to a one-dot chain line part of 18h and a one-dot chain line part of 18j).

Then, at a time t13, when the rich limit torque becomes the target torque, the increasing of the fuel amount and the retarding of the ignition timing are ended. Since the engine 1 operates substantially in Layer 3 but the air amount has not reached to the target air amount, the air-fuel ratio of the mixture gas is richer than the air-fuel ratio set in Layer 3. However, the generation of raw $NO_x$ is reduced.

Note that instead of the comparison of the rich limit torque with the target torque, the ECU 10 may end the increasing of the fuel amount and the retarding of the ignition timing based on the imaginary air-fuel ratio. That is, the ECU 10 may end the increasing of the fuel amount and the retarding of the ignition timing, when the ECU 10 determines that the imaginary air-fuel ratio reaches a given threshold (a threshold at the rich limit).

By permitting that the air-fuel ratio of the mixture gas becomes the fuel rich at the limit below which raw $NO_x$ is not generated, the increasing of the fuel amount and the retarding of the ignition timing can be ended at an earlier stage. Therefore, it becomes advantageous for improving the fuel efficiency of the engine 1.

Then, at a time t14, the air amount reaches the target air amount, and the change to Layer 3 is completed. Note that the increasing of the fuel amount and the retarding of the ignition timing are continued until the air amount reaches the target air amount, and the increasing of the fuel amount and the retarding of the ignition timing may be ended when the air amount reaches the target air amount.

Figure 19:
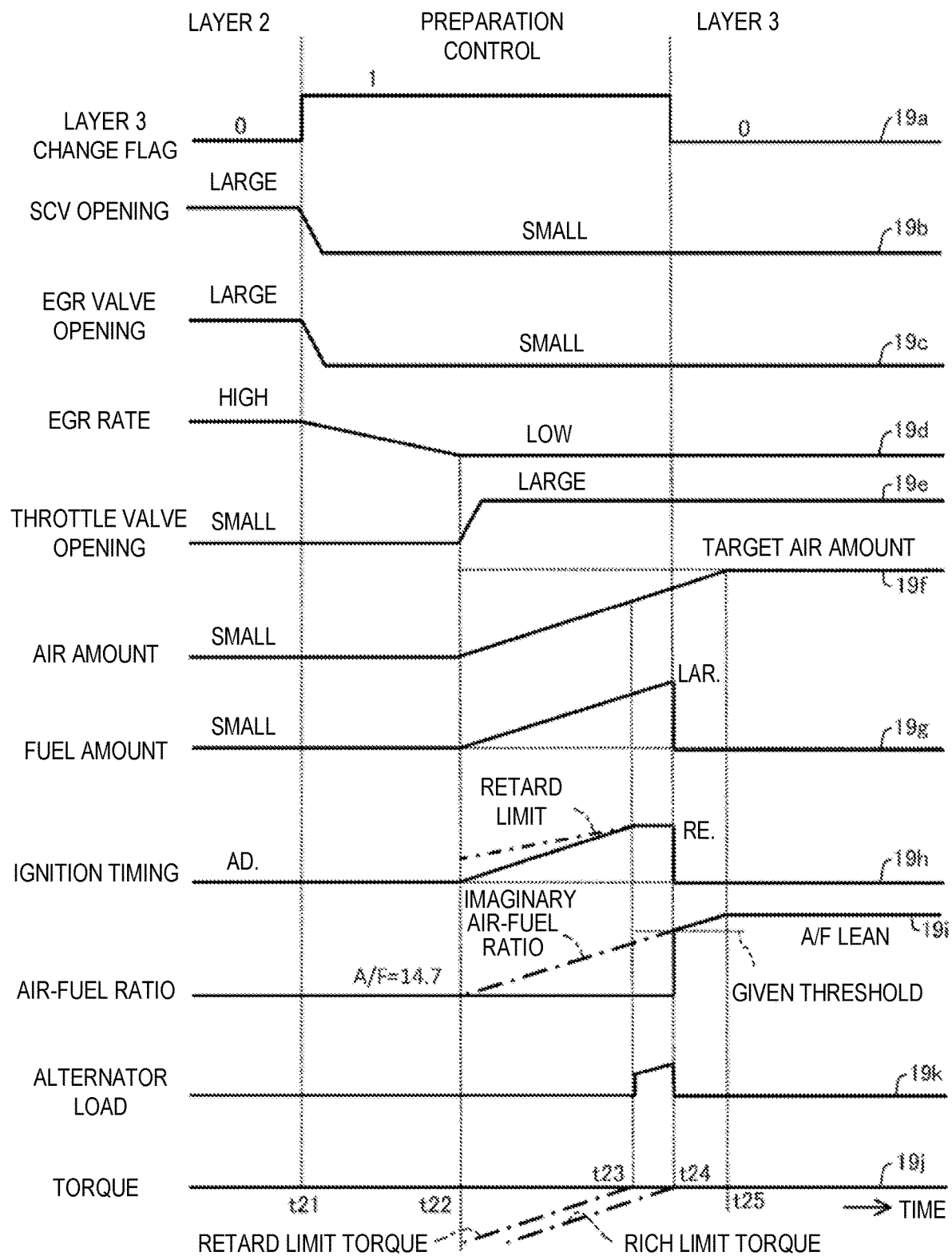
FIG. 19 is a time chart illustrating a change in each parameter when changing from Layer 2 to Layer 3.

FIG. 19 also illustrates a change in each parameter when changing from Layer 2 to Layer 3. When the Layer 3 change flag is changed to 1 at a time t21 (refer to 19a), the openings of the swirl control valve 56 and the EGR valve 54 are changed from large to small (refer to 19b and 19c). The swirl flow inside the combustion chamber 17 changes from the weak swirl to the strong swirl, and the EGR rate in the intake manifold changes from the high EGR rate to the low EGR rate (refer to 19d).

When the EGR rate reaches a given target value at a time t22, the opening of the throttle valve 43 changes from small to large (refer to 19e).

When the opening of the throttle valve 43 increases, the amount of air delivered to the combustion chamber 17 increases gradually (refer to 19f). The fuel injection amount increases corresponding to the increase in the air amount (refer to 19g). The air-fuel ratio of the mixture gas is maintained at the stoichiometric air-fuel ratio or the substantially stoichiometric air-fuel ratio (refer to 19i). The ignition timing is retarded in connection with the increase in the air amount and the fuel amount (refer to 19h). The torque of the engine 1 becomes constant (refer to 19j).

At a time t23, the retard limit torque exceeds the target torque. That is, the retarding amount of the ignition timing reaches the retard limit (refer to a one-dot chain line part of 19h). Since the ignition timing cannot be further retarded, the ECU 10 maintains the retarding amount of the ignition timing. That is, the retarding of the ignition timing is suppressed. Thus, the engine 1 can secure the combustion stability. The ECU 10 suppresses the retarding of the ignition timing, and increases the load of the alternator 57 (refer to 19k). The torque of the engine 1 decreases and the torque becomes constant.

While continuing the increasing of the fuel amount, the retarding of the ignition timing, and the load increasing of the alternator 57, if the rich limit torque becomes the target torque at a time t24 (or the imaginary air-fuel ratio becomes the given threshold), the increasing of the fuel amount and the retarding of the ignition timing are ended. Then, at a time t25, the air amount reaches the target air amount, and the change to Layer 3 is completed.

Moreover, when changing from Layer 2 to Layer 3, the increasing of the fuel amount and the retarding of the ignition timing may be continued until the air amount reaches the target air amount (up to the time t24 or t25), and may be ended when the air amount reaches the target air amount.

Note that the increasing of the fuel amount and the retarding of the ignition timing may be ended at a timing where the retard limit torque reaches the target torque, and the layer may be changed to Layer 3.

Figure 20:
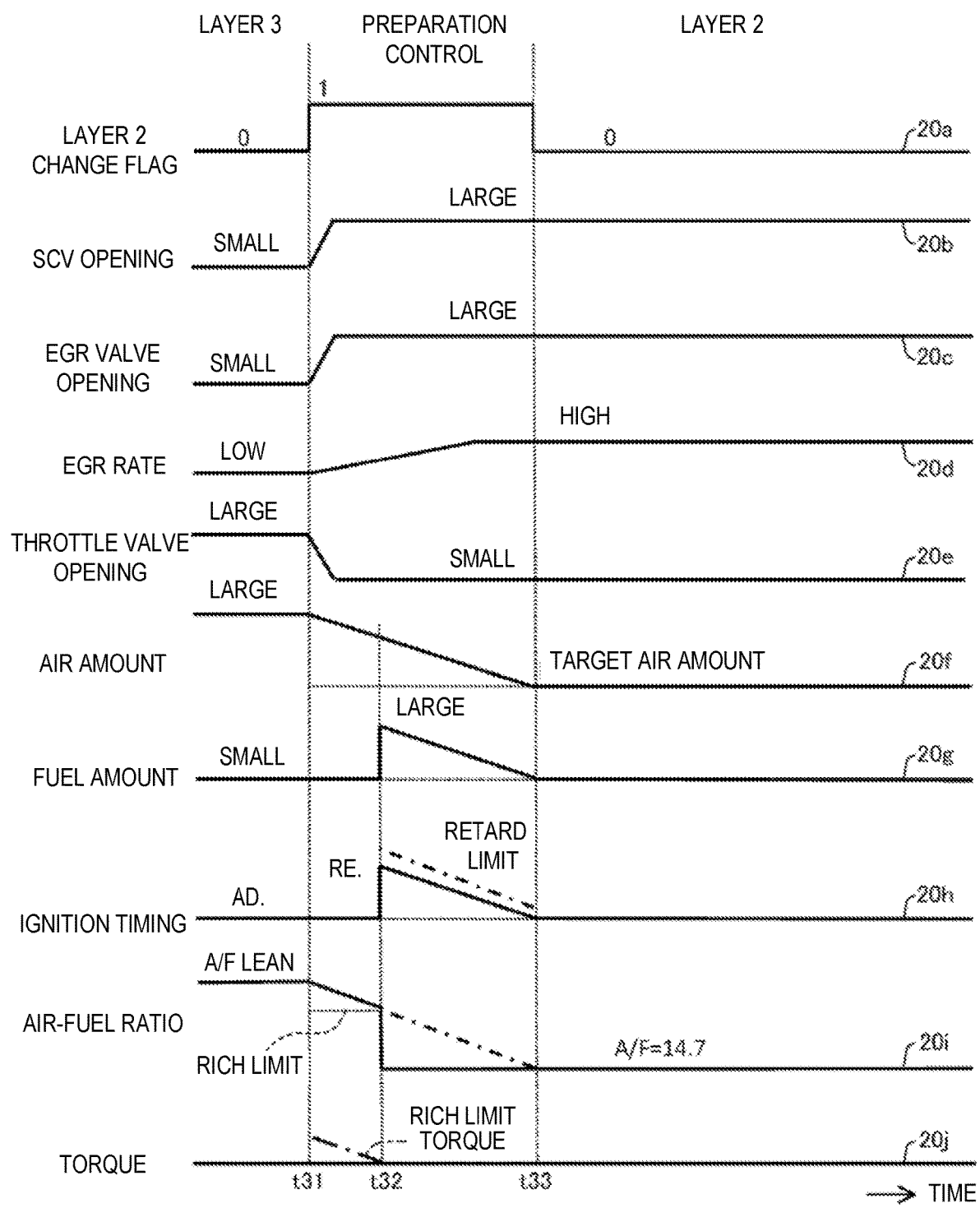
FIG. 20 is a time chart illustrating a change in each parameter when changing from Layer 3 to Layer 2.

FIG. 20 illustrates a change in each parameter when changing from Layer 3 to Layer 2. When the Layer 2 change flag is changed to 1 at a time t31 (refer to 20a), the openings of the swirl control valve 56 and the EGR valve 54 are changed from small to large (refer to 20b and 20c). Thus, the swirl flow inside the combustion chamber 17 changes from the strong swirl to the weak swirl, and the EGR rate in the intake manifold changes from the low EGR rate to the high EGR rate (refer to 20d).

When changing from Layer 3 to Layer 2, the opening of the throttle valve 43 changes from large to small, without waiting for the EGR rate to reach the given target value (refer to 20e). Therefore, the change period from Layer 3 to Layer 2 can be shortened.

When the opening of the throttle valve 43 decreases, the amount of air delivered to the combustion chamber 17 decreases gradually (refer to 20f). The fuel injection amount is maintained until the rich limit torque reaches the target torque, in other words, until the air-fuel ratio reaches the rich limit below which the generation of raw $NO_x$ can be reduced (refer to 20g, 20i, and 20j). By delaying the increasing of the fuel injection amount, it becomes advantageous for improving the fuel efficiency.

At a time t32, when the rich limit torque reaches the target torque, the fuel injection amount is increased so that the air-fuel ratio of the mixture gas becomes the stoichiometric air-fuel ratio or the substantially stoichiometric air-fuel ratio (refer to 20g and 20i). Thus, exhaust gas can be purified using the three-way catalyst.

The ignition timing is retarded in connection with the increase in the fuel amount (refer to 20h). As a result, the torque of the engine 1 becomes constant (refer to 20j).

At a time t33, when the air amount reaches the target air amount, the increasing of the fuel amount and the retarding of the ignition timing are completed, and the change to Layer 2 is completed.

Note that, when changing from Layer 3 to Layer 2, the opening adjustment of the throttle valve 43, and the increasing of the fuel amount and the retarding of the ignition timing may be started, without waiting for the rich limit torque to reach the target torque. That is, the increasing of the fuel amount and the retarding of the ignition timing may be started from the time t31.

Other Embodiments

Note that the technology disclosed herein is not limited to applying to the engine 1 of the configuration described above. The configuration of the engine 1 may adopt various configurations.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Engine
1 ECU (Controller)
10a Target Torque Setting Module
10b First Mode Module
10c Second Mode Module
10d Determining Module
10e Changing Module
11 Cylinder
13 Cylinder Head
17 Combustion Chamber
25 Ignition Plug (Ignition Part)
3 Piston
43 Throttle Valve (Air Adjusting Part)
57 Alternator
6 Injector (Fuel Injection Part)
SW1 Airflow Sensor (Sensor)
SW2 First Intake Air Temperature Sensor (Sensor)
SW3 First Pressure Sensor (Sensor)
SW4 Second Intake Air Temperature Sensor (Sensor)
SW5 Second Pressure Sensor (Sensor)
SW6 Pressure Sensor (Sensor)
SW7 Exhaust Temperature Sensor (Sensor)
SW8 Linear $O_2$ Sensor (Sensor)
SW9 Lambda $O_2$ Sensor (Sensor)
SW10 Water Temperature Sensor (Sensor)
SW11 Crank Angle Sensor (Sensor)
SW12 Accelerator Opening Sensor (Sensor)
SW13 Intake Cam Angle Sensor (Sensor)
SW14 Exhaust Cam Angle Sensor (Sensor)
SW15 EGR Pressure Difference Sensor (Sensor)
SW16 Fuel Pressure Sensor (Sensor)
SW17 Third Intake Air Temperature Sensor (Sensor)

What is claimed is:

1. A control system for a compression ignition engine, comprising:
a combustion chamber of the engine defined by a cylinder, a piston configured to reciprocate inside the cylinder, and a cylinder head closing one end of the cylinder;
a throttle valve configured to adjust an amount of air delivered to the combustion chamber;
an injector attached to the cylinder head and configured to inject fuel to be supplied into the combustion chamber;
an ignition plug disposed so as to be oriented in the combustion chamber and configured to ignite a mixture gas inside the combustion chamber;
a sensor configured to measure a parameter related to an operation of the engine and transmit a measurement signal; and
a controller having circuitry connected with the throttle valve, the injector, the ignition plug, and the sensor, configured to perform a calculation in response to the measurement signal from the sensor and output signals to the throttle valve, the injector, and the ignition plug,
wherein the controller is configured to execute a first mode module in which the engine is operated in a first mode, a second mode module in which the engine is operated in a second mode, and a changing module to change a mode from the first mode to the second mode in response to a change demand,
wherein the first mode module outputs the signals to the injector and the throttle valve so that a fuel amount becomes an amount according to a load of the engine and an air-fuel ratio of the mixture gas becomes a first air-fuel ratio, and outputs an ignition signal to the ignition plug so that a portion of the mixture gas starts combustion accompanied by flame propagation by a forcible ignition of the ignition plug, and a remaining portion of unburnt mixture gas then combusts by self-ignition, wherein the second mode module outputs the signals to the injector and the throttle valve so that the fuel amount becomes the amount according to the engine load and the air-fuel ratio of the mixture gas becomes a second air-fuel ratio higher than the first air-fuel ratio, and outputs the ignition signal to the ignition plug so that a portion of the mixture gas starts combustion accompanied by flame propagation by a forcible ignition of the ignition plug, and a remaining portion of unburnt mixture gas then combusts by self-ignition, wherein the changing module outputs the signal to the throttle valve so that the air amount increases more than before the change demand while maintaining the first mode, and outputs to the injector a signal to increase the fuel amount according to the increase in the air amount so that the air-fuel ratio of the mixture gas becomes a stoichiometric air-fuel ratio or a substantially stoichiometric air-fuel ratio while maintaining the first mode, and outputs to the ignition plug a signal to retard an ignition timing so that a torque increase of the engine caused by the increase in the fuel amount is reduced while maintaining the first mode, and wherein the changing module increases the retarding of the ignition timing until the ignition timing reaches a retard limit, maintains the ignition timing at the retard limit for a predetermined time duration, and then switches the operation of the engine from the first mode to the second mode when the changing module determines that the ignition timing has reached the retard limit and the ignition timing has been maintained for the predetermined time duration.

2. The control system of claim 1, wherein when the ignition timing is determined to have reached the retard limit, the changing module continues the increasing of the fuel amount and increases a load of an alternator driven by the engine.

3. The control system of claim 2, wherein the changing module changes the mode from the first mode to the second mode, while the torque of the engine is maintained at a constant or substantially constant torque.

4. The control system of claim 2, wherein the retard limit is on a retard side as an engine speed is lower and the load is higher, and on an advance side as the engine speed is higher and the load is lower.

5. The control system of claim 4, further comprising an exhaust gas recirculation (EGR) valve configured to adjust an amount of EGR gas introduced into the combustion chamber,
wherein the changing module outputs the signal to the EGR valve so that the EGR amount decreases more than before the change demand.

6. The control system of claim 5,
wherein the controller is further configured to adjust a strength of swirl inside the combustion chamber by adjusting an opening of a swirl valve, and
wherein the changing module outputs the signal to a swirl regulating part so that the opening of the swirl valve becomes smaller than before the change demand.

7. The control system of claim 1, wherein when the air amount is determined to have reached a given amount, the changing module ends the increasing of the fuel amount and the retarding of the ignition timing, and permits that the second mode module starts the second mode.

8. The control system of claim 1, wherein the changing module changes the mode from the first mode to the second mode, while the torque of the engine is maintained at a constant or substantially constant torque.

9. The control system of claim 1, wherein the retard limit is on a retard side as an engine speed is lower and the load is higher, and on an advance side as the engine speed is higher and the load is lower.

10. The control system of claim 1, further comprising an exhaust gas recirculation (EGR) valve configured to adjust an amount of EGR gas introduced into the combustion chamber,
wherein the changing module outputs the signal to the EGR valve so that an EGR amount decreases more than before the change demand.

11. The control system of claim 1,
wherein the controller is further configured to adjust a strength of swirl inside the combustion chamber by adjusting an opening of a swirl valve, and
wherein the changing module outputs the signal to the swirl valve so that the opening of the swirl valve becomes smaller than before the change demand.

12. The control system of claim 1, wherein the first air-fuel ratio is the stoichiometric air-fuel ratio or the substantially stoichiometric air-fuel ratio, and the second air-fuel ratio is 25:1 or higher.

13. The control system of claim 1,
wherein the controller is further configured to execute a target torque setting module to set a target torque of the engine in response to the measurement signal from the sensor,
wherein the first mode module outputs the signals to the injector and the throttle valve so that a fuel amount becomes an amount according to the target torque and the air-fuel ratio of the mixture gas becomes the first air-fuel ratio, and
wherein the second mode module outputs the signals to the injector and the throttle valve so that the fuel amount becomes the amount according to the target torque and the air-fuel ratio of the mixture gas becomes the second air-fuel ratio.

14. The control system of claim 1,
wherein the controller is further configured to execute a target torque setting module to set a target torque of the engine in response to the measurement signal from the sensor,
wherein the first mode module outputs, in response to the target torque, the signals to the injector and the throttle valve so that the fuel amount becomes an amount according to the target torque and the air-fuel ratio of the mixture gas becomes the first air-fuel ratio, and
wherein the second mode module outputs, in response to the target torque, the signals to the injector and the throttle valve so that the fuel amount becomes the amount according to the target torque and the air-fuel ratio of the mixture gas becomes the second air-fuel ratio.

15. The control system of claim 1, wherein the first mode is operated in a low engine load range, and the second mode is operated in a medium engine load range higher than the low engine load range.

16. The control system of claim 1, wherein the controller switches the operation of the engine from the first mode to the second mode when the controller determines that an engine coolant temperature is above a predetermined engine coolant temperature threshold and an intake air temperature is above a predetermined intake air temperature threshold.

17. A control system for a compression ignition engine, comprising:
- a combustion chamber of the engine defined by a cylinder, a piston configured to reciprocate inside the cylinder, and a cylinder head closing one end of the cylinder;
- a throttle valve configured to adjust an amount of air delivered to the combustion chamber;
- an injector attached to the cylinder head and configured to inject fuel to be supplied into the combustion chamber;
- an ignition plug disposed so as to be oriented in the combustion chamber and configured to ignite a mixture gas inside the combustion chamber;
- a sensor configured to measure a parameter related to an operation of the engine and transmit a measurement signal; and
- a controller having circuitry connected with the throttle valve, the injector, the ignition plug, and the sensor, configured to perform a calculation in response to the measurement signal from the sensor and output signals to the throttle valve, the injector, and the ignition plug,
- wherein the controller includes a first mode module in which the engine is operated in a first mode, a second mode module in which the engine is operated in a second mode, and a changing module to change a mode from the second mode to the first mode in response to a change demand,
- wherein the first mode module outputs the signals to the injector and the throttle valve so that a fuel amount becomes an amount according to a load of the engine and an air-fuel ratio of the mixture gas becomes a first air-fuel ratio, and outputs an ignition signal to the ignition plug so that a portion of the mixture gas starts combustion accompanied by flame propagation by a forcible ignition of the ignition plug, and a remaining portion of unburnt mixture gas then combusts by self-ignition,
- wherein the second mode module outputs the signals to the injector and the throttle valve so that the fuel amount becomes the amount according to the load of the engine and the air-fuel ratio of the mixture gas becomes a second air-fuel ratio higher than the first air-fuel ratio, and outputs the ignition signal to the ignition plug so that a portion of the mixture gas starts combustion accompanied by flame propagation by a forcible ignition of the ignition plug, and a remaining portion unburnt mixture gas combusts by self-ignition,
- wherein the changing module outputs the signal to the throttle valve so that the air amount decreases more than before the change demand, and maintains the fuel amount until the air-fuel ratio of the mixture gas reaches a particular air-fuel ratio smaller than the second air-fuel ratio after the reducing of the air amount is started,
- wherein when the air-fuel ratio of the mixture gas is determined to have reached the particular air-fuel ratio, the changing module continues the reducing of the air amount, outputs to the injector a signal to increase the fuel amount so that the air-fuel ratio of the mixture gas becomes a stoichiometric air-fuel ratio or a substantially stoichiometric air-fuel ratio, and outputs to the ignition plug a signal to retard an ignition timing so that a torque increase of the engine by the increase in the fuel amount is reduced,
- wherein the controller controls the ignition plug to retard the ignition timing, controls the injector to increase the fuel amount, and controls the throttle valve to reduce the air amount while maintaining the operation of the engine in the second mode, and
- wherein the controller controls the ignition plug to increase the retarding of the ignition timing until the ignition timing reaches a retard limit, maintains the ignition timing at the retard limit for a predetermined time duration, controls the injector to end the increase of the fuel amount, and then switches the operation of the engine from the second mode to the first mode when the controller determines that the air amount has reached a given air amount, the ignition timing has reached the retard limit, and the ignition timing has been maintained for the predetermined time duration.

18. The control system of claim 17,
- wherein the controller is further configured to execute a target torque setting module to set a target torque of the engine in response to the measurement signal from the sensor,
- wherein the first mode module outputs, in response to the target torque, the signals to the injector and the throttle valve so that the fuel amount becomes an amount according to the target torque and the air-fuel ratio of the mixture gas becomes the first air-fuel ratio, and
- wherein the second mode module outputs, in response to the target torque, the signals to the injector and the throttle valve so that the fuel amount becomes the amount according to the target torque and the air-fuel ratio of the mixture gas becomes the second air-fuel ratio.

19. A control system for a compression ignition engine, comprising:
- a combustion chamber of the engine defined by a cylinder, a piston configured to reciprocate inside the cylinder, and a cylinder head closing one end of the cylinder;
- a throttle valve configured to adjust an amount of air delivered to the combustion chamber;
- an injector attached to the cylinder head and configured to inject fuel to be supplied into the combustion chamber;
- an ignition plug disposed so as to be oriented in the combustion chamber and configured to ignite a mixture gas inside the combustion chamber;
- a sensor configured to measure a parameter related to an operation of the engine; and
- a controller having circuitry connected with the throttle valve, the injector, the ignition plug, and the sensor, and configured to perform a calculation in response to the measurement signal from the sensor and output signals to the throttle valve, the injector, and the ignition plug,
- wherein the controller is configured to execute:
  - a first mode module in which the engine is operated in a first mode based on the measurement signal from the sensor;
  - a second mode module in which the engine is operated in a second mode based on the measurement signal from the sensor;
  - a determining module to output a change demand from the first mode to the second mode when the determining module determines that a change condition is satisfied based on the measurement signal from the sensor; and a changing module to change the mode in response to the change demand, wherein the first mode module outputs the signals to the injector and the throttle valve so that a fuel amount becomes an amount according to a load of the engine and an air-fuel ratio of the mixture gas becomes a first air-fuel ratio, and outputs an ignition signal to the ignition plug so that a portion of the mixture gas starts combustion accompanied by flame propagation by a forcible ignition of the ignition plug, and a remaining portion of unburnt mixture gas then combusts by self-ignition, wherein the second mode module outputs the signals to the injector and the throttle valve so that the fuel amount becomes the amount according to the load of the engine and the air-fuel ratio of the mixture gas becomes a second air-fuel ratio higher than the first air-fuel ratio, and outputs the ignition signal to the ignition plug so that a portion of the mixture gas starts combustion accompanied by flame propagation by a forcible ignition of the ignition plug, and a remaining portion of unburnt mixture gas then combusts by self-ignition, wherein the changing module outputs the signal to the throttle valve so that the air amount increases more than before the change demand while maintaining the first mode, and outputs to the injector a signal to increase the fuel amount according to the increase in the air amount so that the air-fuel ratio of the mixture gas becomes a stoichiometric air-fuel ratio or a substantially stoichiometric air-fuel ratio while maintaining the first mode, and outputs to the ignition plug a signal to retard an ignition timing so that a torque increase of the engine caused by the increase in the fuel amount is reduced while maintaining the first mode, and wherein the changing module increases the retarding of the ignition timing until the ignition timing reaches a retard limit, maintains the ignition timing at the retard limit for a predetermined time duration, and then switches the operation of the engine from the first mode to the second mode when the changing module determines that the ignition timing has reached the retard limit and the ignition timing has been maintained for the predetermined time duration.

20. The control system of claim 19, wherein the controller is further configured to execute a target torque setting module to set a target torque of the engine in response to the measurement signal from the sensor, wherein the first mode module outputs, in response to the target torque, the signals to the injector and the throttle valve so that a fuel amount becomes an amount according to the target torque and the air-fuel ratio of the mixture gas becomes the first air-fuel ratio, and wherein the second mode module outputs, in response to the target torque, the signals to the injector and the throttle valve so that the fuel amount becomes the amount according to the target torque and the air-fuel ratio of the mixture gas becomes the second air-fuel ratio.

* * * * *